United States Patent [19]
Kim

[11] Patent Number: 6,014,348
[45] Date of Patent: Jan. 11, 2000

[54] METHOD AND APPARATUS OF READING WRITTEN INFORMATION FROM MAGNETO-OPTICAL WRITING MEDIA

[75] Inventor: Dae Young Kim, Seoul, Rep. of Korea

[73] Assignee: LG Electronic Inc., Seoul, Rep. of Korea

[21] Appl. No.: 09/031,672

[22] Filed: Feb. 27, 1998

[30] Foreign Application Priority Data

Nov. 14, 1997 [KR] Rep. of Korea .................. 97-60066

[51] Int. Cl.[7] .................................................. G11B 11/00
[52] U.S. Cl. ........................................... 369/13; 369/59
[58] Field of Search ........................ 399/13, 14, 116, 399/110, 59, 54, 47, 48, 124; 300/59, 114

[56] References Cited

U.S. PATENT DOCUMENTS

| | | | |
|---|---|---|---|
| 5,001,692 | 3/1991 | Farla et al. | 369/48 |
| 5,381,397 | 1/1995 | Okada | 369/124 |
| 5,450,381 | 9/1995 | Tsukamura et al. | 369/13 |
| 5,629,912 | 5/1997 | Okawa et al. | 369/44.29 |
| 5,675,569 | 10/1997 | Yamaguchi et al. | 369/124 |
| 5,802,031 | 9/1998 | Clark et al. | 369/59 |

FOREIGN PATENT DOCUMENTS

| | | |
|---|---|---|
| 63-173252 | 7/1988 | Japan . |
| 1292603 | 11/1989 | Japan . |
| 4325948 | 11/1992 | Japan . |

*Primary Examiner*—Tan Dinh

[57] ABSTRACT

Methods and apparatus of reading the written information from the magneto-optical writing media are disclosed. According to the present invention, when the level value of an electrical signal detected from the magneto-optical writing media by a reading beam irradiated in synchronization with a clock signal is shifted from a first level value to a second level value, a phase control signal generator generates a phase control signal of the clock signal by using the difference between the shifted second level value and the following detected second level value. This phase control signal is applied to the clock signal generator and controls the time advance and the time delay of the clock signal. Therefore, the written mark and the reading beam spot are coincided to each other.

23 Claims, 19 Drawing Sheets reading clock laser beam pulse written mark readout signal

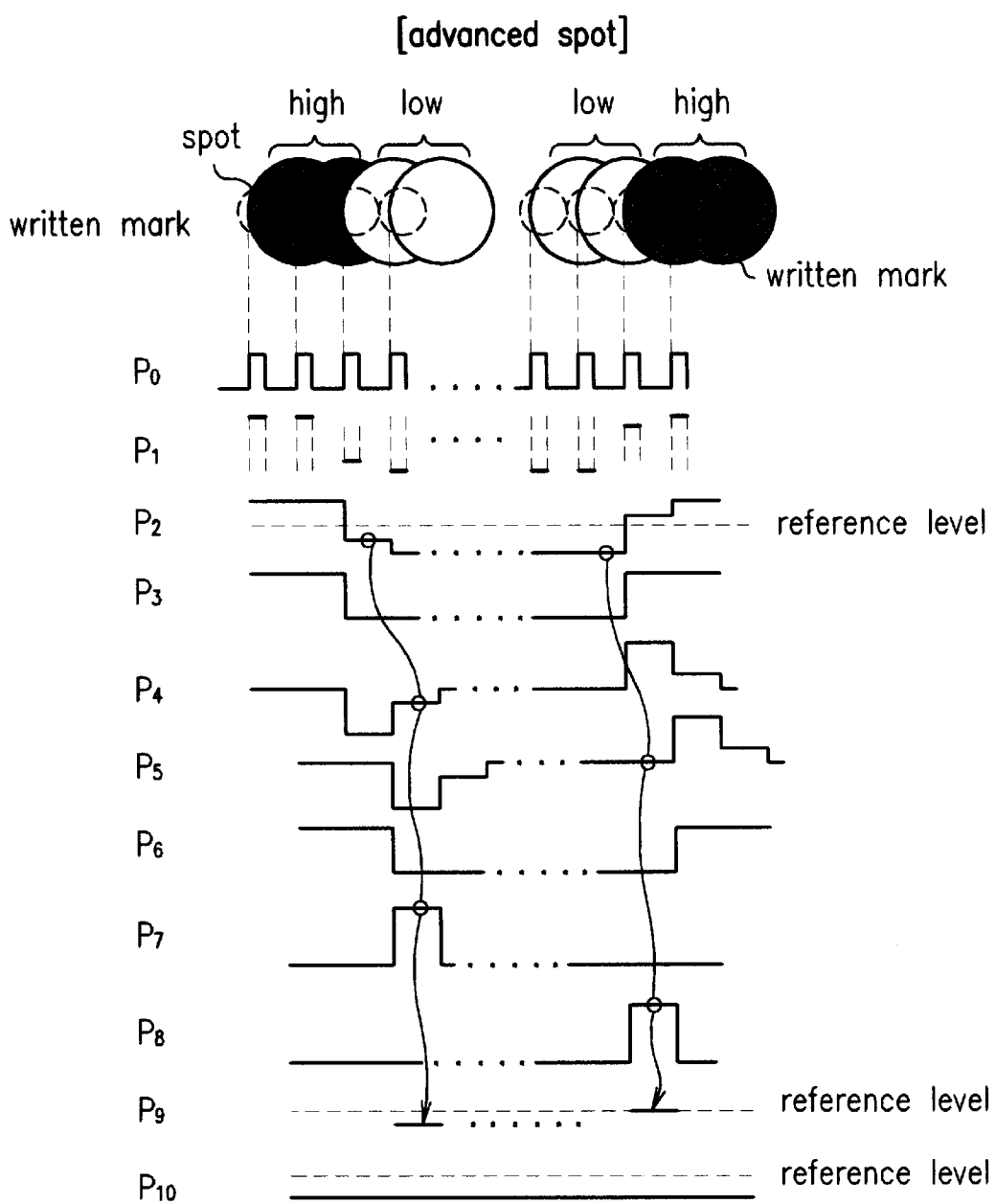

METHOD AND APPARATUS OF READING WRITTEN INFORMATION FROM MAGNETO-OPTICAL WRITING MEDIA

BACKGROUND OF THE INVENTION

1. Field of the Invention

The present invention relates to methods and apparatus reading the information written on a magneto-optical writing media.

2. Discussion of the Related Art

A magneto-optical writing media has been in practical use as information writing media which is possible to rewrite on the writing media with a high density. In particular, the writing media having a writing layer made of the amorphous alloy of rare-earth and transition metals have a remarkable characteristic.

The explanation for an example of writing information on the magneto-optical writing media is as follows. By focusing a laser beam on the surface of a magneto-optical writing media as a spot whose diameter is as short as the wavelength of the light, the temperature of the writing layer is raised up to 150° C.–200° C. Thus, if the temperature of the writing media heated by the laser beam goes up to Curie temperature (Tc), the magnetization is disappearing. At this time, if constant magnetic bias field is applied in one direction by a magnet, a magnetic mark(or a pit) is written on the writing layer by the magnetic inversion occurring when the heated area returns to the room temperature.

Referring to FIGS. 1 and 2, the process for writing the information on the magnetooptical writing media is explained. FIG. 1 is a diagram showing a conventional writing apparatus writing the information on the magneto-optical writing media. FIG. 2 is a timing diagram to explain the operation of the apparatus in FIG. 1. Based on the information initially preformatted on the optical disk, a channel clock signal generator 9 generates a channel clock signal 10. According to the channel clock signal 10, laser driver 11 makes the laser diode 1 emit a pulse beam. This laser light 2 is irradiated on the optical disk 8 as an optical spot 4 by an objective lens 3. On the other hand, through a magnetic head 5 closely disposed to optical disk 8, a data signal generator 6 generates a modulation magnetic field 7. As shown in FIGS. 2(a) to 2(e), if the frequency of channel clock signal 10 is increased and the laser beam focussed as an optical spot 4 is irradiated on the optical disk 8 as a pulse type, according to the combination of the pulse type laser beam and the modulation magnetic field, the optical spot 4 in synchronization with the channel clock signal 10 is irradiated on the optical disk 8. In response to the optical spot irradiated like this, marks are overlapped and then written on the optical disk 8. According to this method, the writing of the magnetic mark which has a mark length shorter than the optical spot 4 is done. This method is a known technique published in Japanese patent publication Pyungsung No 1-292603.

On the other hand, as a method for reading the written information on the optical disk, a method for focusing a laser beam with a constant output power as a spot whose diameter is as short as its wavelength and then for irradiating the beam spot on the surface of the magnetooptical writing media is well known.

The focussed optical spot is reflected from the surface of the magneto-optical writing media. At this time, the polarization state of the laser beam is changed by Kerr effect. By optically detecting the change of the polarization state of the reflection light, the information written on the magneto-optical writing media in magnetic state is read from the writing media. However, as shown in FIG. 3, as the information is written on the magneto-optical writing media in high density, the length of the magnetic mark is getting shorter and the optical spot is longer than the magnetic pit( or mark). As the result, a problem arises in the resolution capability when the mark is read.

In order to solve this problem, super resolution techniques have been attempted. As one of the techniques, a method of magnetically induced super resolution(MSR) using an exchange coupling force has been introduced. A method of using an in-plane magnetic layer which is a kind of the MSR is shown in FIG. 4. As shown in FIG. 4, the magneto-optical writing media consists of two layers having an exchange coupling structure between a reading layer with a relatively low coercivity and a writing layer with a relatively high coercivity. The reading layer has the in-plane magnetic layer. However, when the temperature of the layer is over a specific temperature, the magnetic orientation of the reading layer changes and becomes perpendicular magnetization. The writing layer is a perpendicular magnetization layer so as to maintain the information. If the laser beam is irradiated on the reading layer in order to read the information, the magnetization of the reading layer of high temperature area in the middle of the optical spot (the area with the temperature above threshold value in FIG. 4) is changed from the in-plane magnetization to the perpendicular magnetization, and then a polar Kerr effect comes out. In other words, the magnetic field in the high temperature area of the reading layer is changed into the direction of the magnetic field of the writing layer. On the contrary, because the Kerr effect does not occur in the low temperature area in the neighborhood, the magnetization of the writing layer is masked. Therefore, if the power of the reading laser beam is properly selected, the written information is read from the high temperature area corresponding to the middle of the laser spot, and, as the result, the reading operation in super resolution is possible.

However, because the method of reading a small magnetic pit(or mark) by masking the reading layer like this uses a subtle temperature distribution in the light spot, the change in the magnetic orientation is affected by the fluctuation of the rotation speed of the laser disk and the change in the power of the reading laser beam, and therefore is unsatisfactory As the result, a good carrier-to-noise ratio is not obtained. Therefore, the error rate becomes high and the jitter occurs, and a good quality of the readout signal is not obtained.

As a method to solve this problem, the technique irradiating a reading laser beam in a pulse synchronized with the channel clock signal is disclosed in Japanese patent publication Pyungsung 4-325948. According to this technique, there is a merit making the error rate very low.

FIG. 5 shows an example of the apparatus reading the information written on the optical writing media. FIG. 6 is a timing diagram to explain the operation of the apparatus in FIG. 5. In this reading apparatus, a method irradiating a laser light of a pulse as a reading light is adopted. Based on the reading clock signal of clock generator 58 shown in FIG. 6, a pulse shaper 57 outputs a signal of the pulse type. Laser driver 56 in response to this pulse signal drives the laser diode 55. As shown in FIG. 6, the laser beam emitted from the laser diode 55 in the pulse type is focussed on the surface of the optical writing media 51 by a collimator lens 54 and an objective lens 52. The laser beam spot focussed on the optical writing media 51 is reflected from the reading layer and passed through the objective lens 52, and then comes toward the first polarized beam splitter 53. The optical spot is again applied to the second polarized beam splitter 59 by the first polarized beam splitter 53. In this splitter 59, p-polarization component of the light spot is transmitted through the splitter 59 and s-polarization component is reflected from the splitter 59.

The p-polarization component and the s-polarization component are focussed and then converted into electrical signals by the first photo detector 61 and the second photo detector 60, respectively. The photoelectric converted electrical signals are applied to the difference amplifier 62, are amplified and are outputted as a signal shown in FIG. 6(d). The readout signal processor 63 processes the output signal of the difference amplifier 62 and then generates a bit signal corresponding to the detected information written on the media, that is, a binary signal. FIG. 6 shows the written marks written on the optical writing media 51. In FIG. 6(c), the hatched marks are the binary signals of high level and the white marks are the binary signals of low level.

As described above in detail, when irradiating the pulse type of laser beam on the optical disk and reading the information written on the magneto-optical writing media, the laser beam spot of the pulse type may not be exactly focussed on the written mark because of the fluctuation of the magneto-optical disk and the external disturbances. In this case, as in A region of FIG. 6, the laser beam spot of the reading light is irradiated over the two magnetic domains, i.e., two written marks having different levels to each other. Therefore, the regeneration signal from the magneto-optical writing media is not detected. B region in FIG. 6 shows the case for the laser beam spot being normally irradiated on the only one written mark.

SUMMARY OF THE INVENTION

Accordingly, the present invention is directed to methods and apparatus for reading, without error, the written information from a magneto-optical writing media that substantially obviates one or more of the problems due to limitations and disadvantages of the related art.

Another object of the present invention is to provide a method and an apparatus exactly detecting the regenerated bit signal from the optical writing media when the pulse type of regeneration beam is irradiated on the optical writing media.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, methods and apparatus according to the present invention includes a sample and holder to exactly sample and hold the regenerated electrical signal detected from optical writing media under consideration of the delay time occurring when the regenerated electrical signal is detected by irradiating the pulse type of the regeneration beam on the optical writing media.

Therefore, according to the method and the apparatus of the present invention, during irradiating a reading beam synchronized with a clock signal on the written mark of the optical writing media and detecting an electrical signal, an electrical signal with a first level value is shifted to an electrical signal with a second level value. At the same time as shifted, an electrical signal as the signal with the same second level value is detected. And then, the difference signal between the shifted signal with the second level value and the detected signal with the second level value is detected. From this difference signal, a phase control signal of the clock signal is generated and this phase control signal controls the advanced or the delayed of the clock signal. Therefore, by the controlled clock signal, the reading beam spot is exactly irradiated on the written mark of the magneto-optical writing media.

It is to be understood that both the foregoing general description and the following detailed description are example, and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Referring to FIGS. 7 to 13, the embodiments according to the method and the apparatus of the present invention are described in detail.

Figure 1:
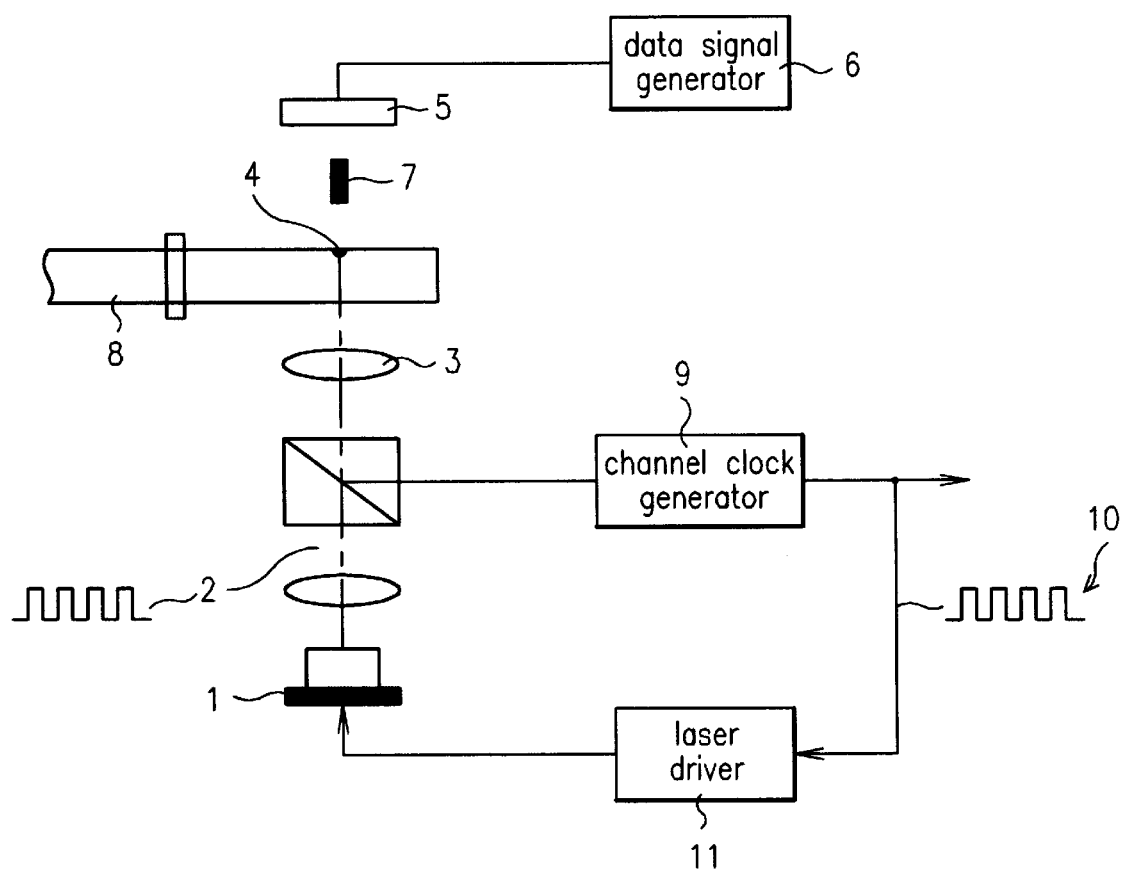
FIG. 1 is a diagram showing a conventional apparatus reading the information on the magneto-optical writing media.
Figure 2:
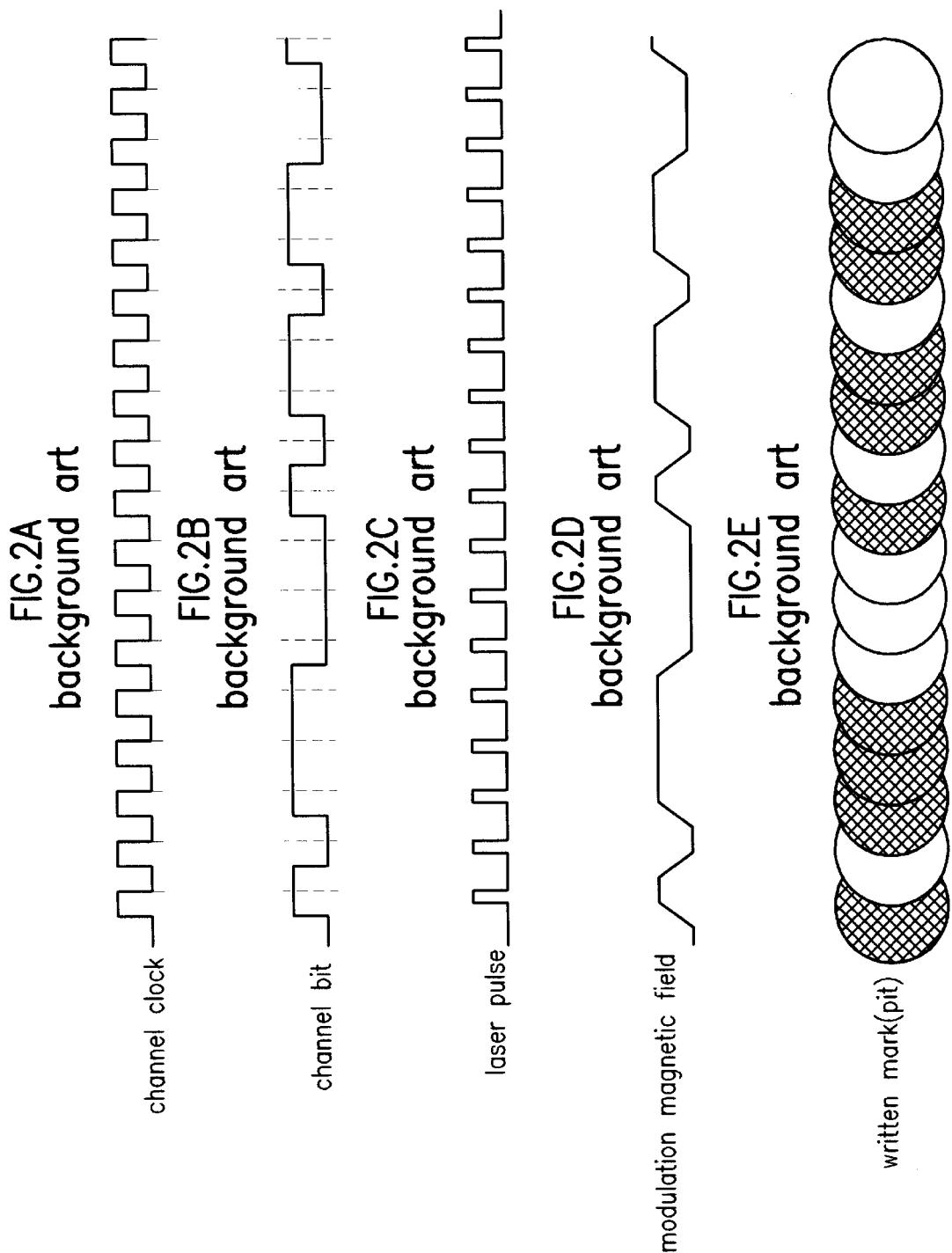
FIGS. 2(a) to 2(e) are the diagrams showing the timing signals observed at the various points in FIG. 1.
Figure 3:
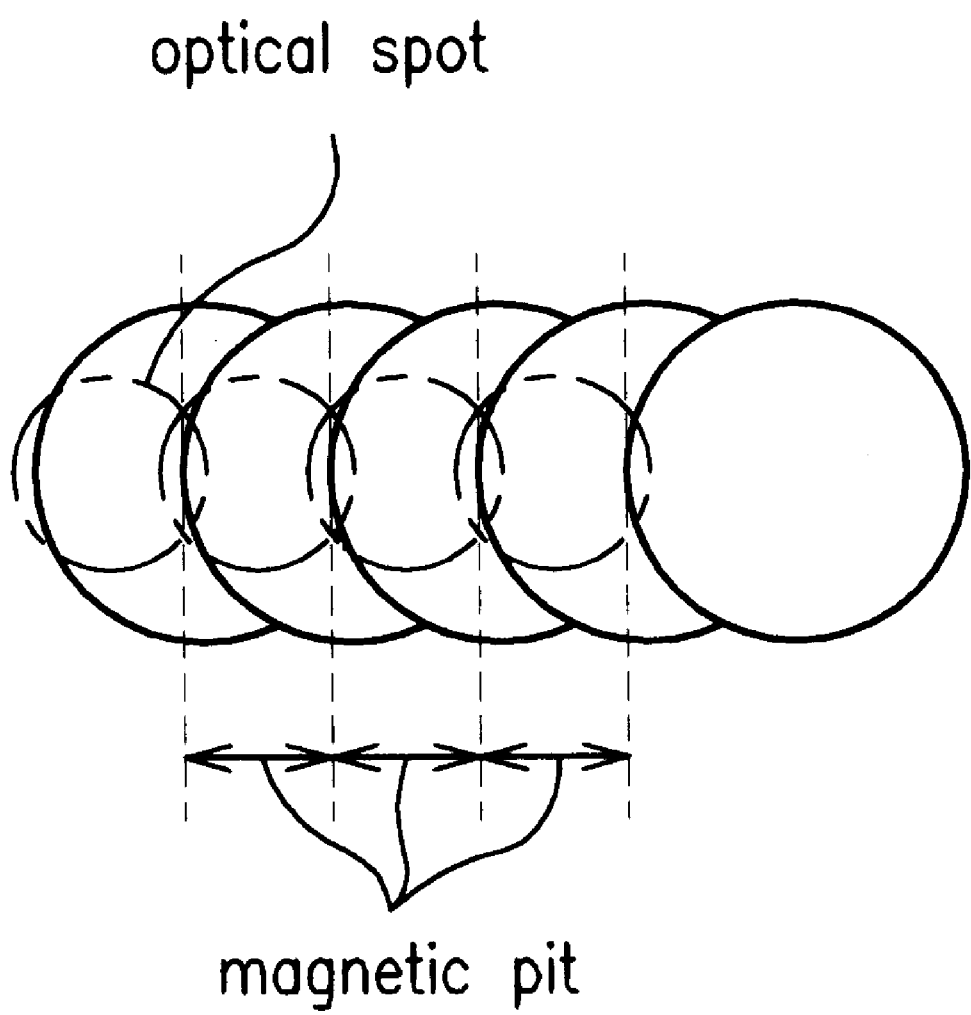
FIG. 3 is a diagram to show the problems occurring in reading the information written in high density on the magneto-optical writing media.
Figure 4:
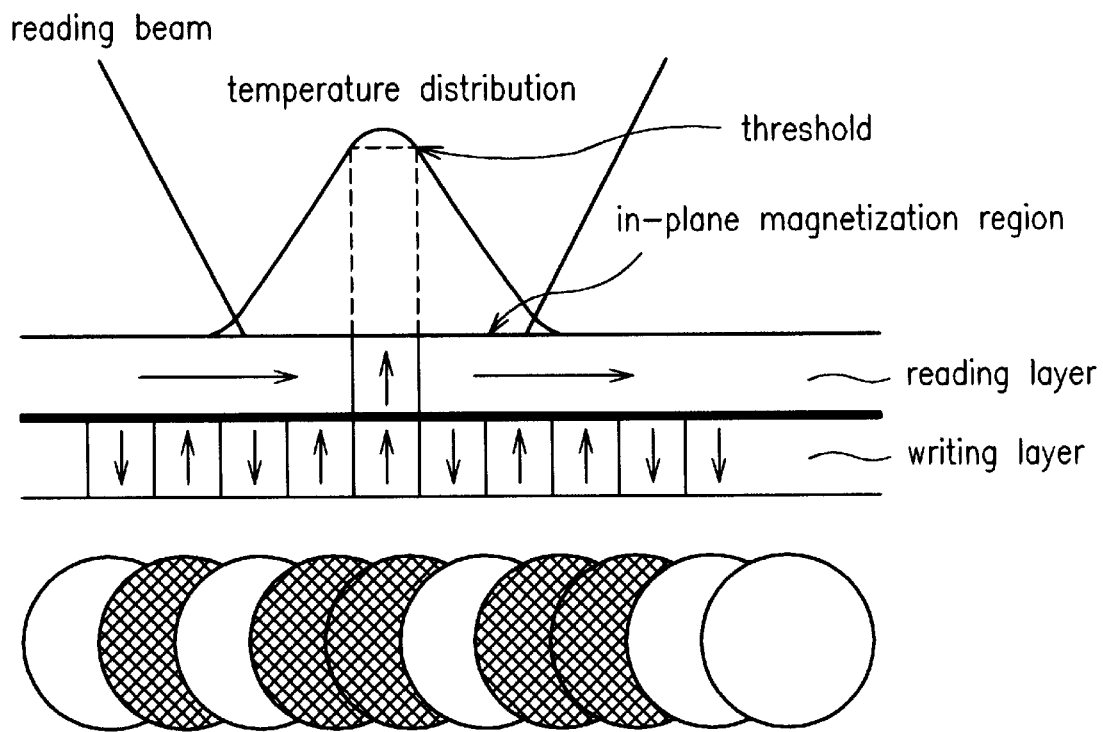
FIG. 4 is a diagram showing the MSR technique which reads the written information by using the in-plane magnetization layer.
Figure 5:
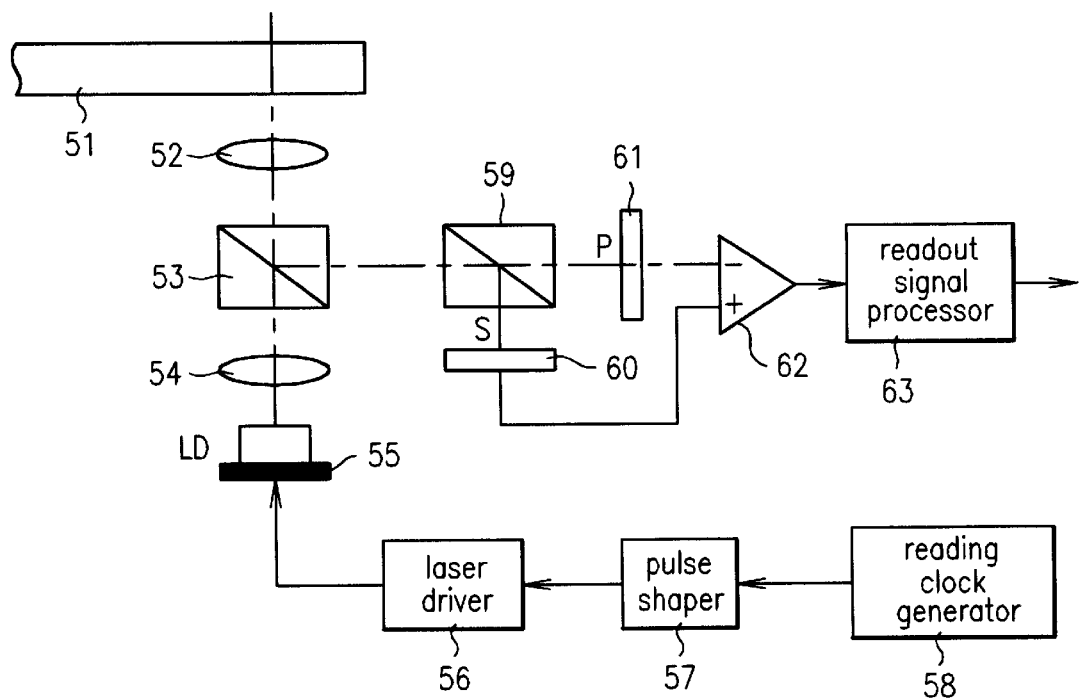
FIG. 5 is a diagram to show another conventional apparatus reading the written information from the magneto-optical writing media.
Figure 6A:
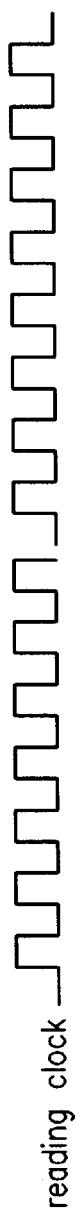
FIG. 6(a–o) is a diagram showing the timing signals to explain the operation of the apparatus shown in FIG. 5.
Figure 6B:
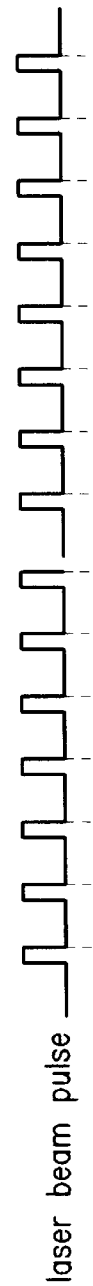
Figure 6C:
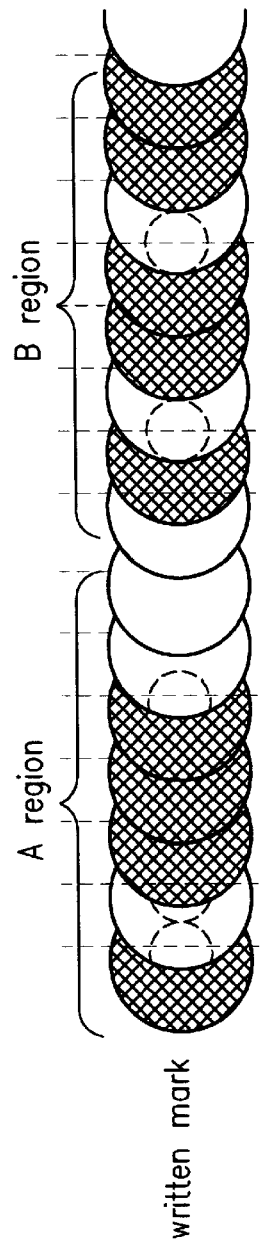
Figure 6D:
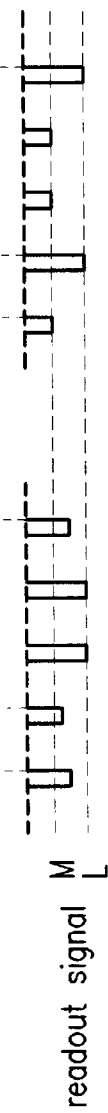
Figure 7:
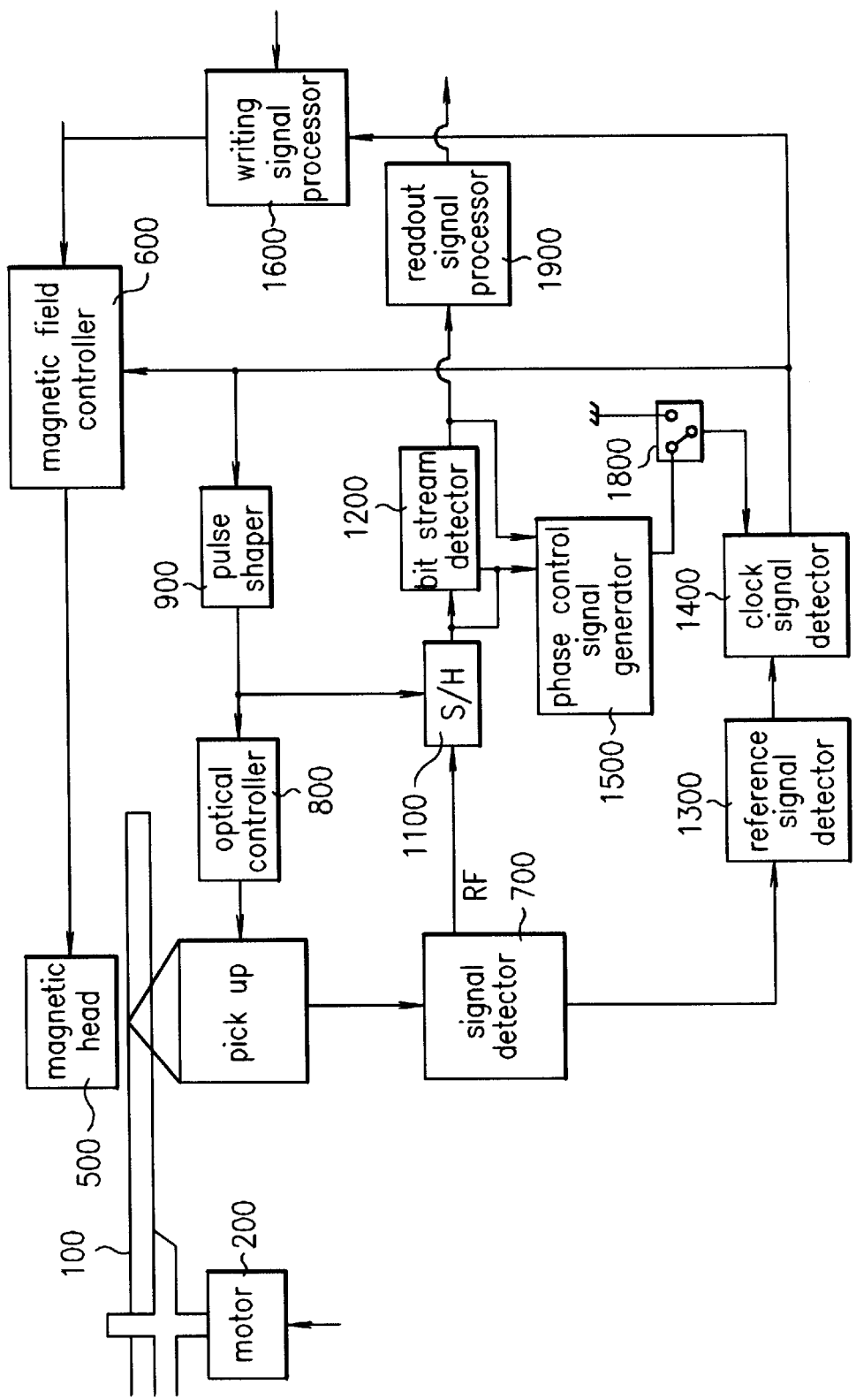
FIGS. 7 is a block diagram showing the reading apparatus according to the present invention.

FIG. 7 is a block diagram of the apparatus reading the written information from the magneto-optical writing media, i.e., the optical disk according to the present invention. In FIG. 7, when a reading beam, i.e., a laser beam is irradiated on the magneto-optical writing media, i.e., the optical disk, signal detector 700 detects an electrical signal corresponding to the written information. A reference signal detector 1300 detects am auxiliary signal included in said electrical signal as a reference signal to generate a channel clock signal.

This auxiliary signal corresponds to the synchronization signal or the prepit included in a wobbling signal.

The channel clock generator 1400, by using said reference signal, generates clock signals for the writing and the reading. These clock signals for the writing are applied to a magnetization controller 600 and a pulse shaper 900, and the clock signals for the reading are applied to the only pulse shaper 900. Here, FIG. 7 is the apparatus for executing the operation of both the writing and the reading, and the channel clock signal generator 1400 is used in common for the writing and the reading. In the structure of FIG. 7, based on the auxiliary signal included in the detected information, that is, the detected electrical signal, the clock signal is generated. But, without this auxiliary signal, the channel clock signal may be generated within the channel clock signal generator 1400. However, because the present invention is to relate to the reading apparatus and the method reading the written information from the magneto-optical writing media, i.e., the optical disk 100 by using the apparatus, and hereafter the only reading operation is explained in detail. When the clock signal from the clock signal generator 1400 is applied to the pulse shaper 900, a pulse signal is generated in synchronization with the clock signal and this pulse signal is applied to the optical controller 800. Based on the pulse signal, the optical controller 800 applies a control signal of pulse type to the laser diode 1700 and the laser diode 1700 generates a laser beam of the pulse type. On the contrary, the pulse signal is applied to a first sample and holder 1100 as a driving signal. When this driving signal is applied, the first sample and holder 1100 samples and holds the electrical signal obtained from the signal detector 700.

The electrical signal sampled and held is converted into a readout bit stream by a bit stream detector 1200 and then applied to a readout signal processor 1900. The readout signal processor 1900 receives the readout bit signal, detects the errors of the readout bit signal and corrects the errors. In FIG. 7, a phase control signal generator 1500 receives the analog electrical signal from the first sample and holder 1100 and the readout bit signal from the bit stream detector 1200, and generates a phase control signal of said clock signal. That is, when the detected electrical signal is shifted from a first level value to a second level value, the phase control signal generator compares the second level value obtained by shifting with the electrical signal of a second level value measured when the shifting is done, and detects the difference between said two second level values. From the detected difference signal, the phase control signal of said clock signal is obtained. Thus, in order to obtain the phase control signal, said readout bit signal and said electrical signal are delayed at least one time by the period of the clock signal (or by the width of the written mark). Furthermore, by properly processing at least one of the delayed electrical signal and the readout bit signals, and the signals prior to being delayed, the phase control signal for the pulse signal or the clock signal for the laser beam spot to be exactly irradiated on one of the written marks of the optical disk 100 is generated. The clock signal generator 1400 according to this phase control signal generates the clock signal being advanced or delayed or without a change of its period. Therefore, when the laser beam spot is not exactly irradiated on the written mark, by controlling the phase of the clock signal, the laser beam spot and the position of the written mark exactly correspond with each other. In FIG. 7, unexplained number 500 is a magnetic head for applying a magnetic field to the optical disk 100, and number 200 is a motor to rotate the optical disk 100.

Figure 8:
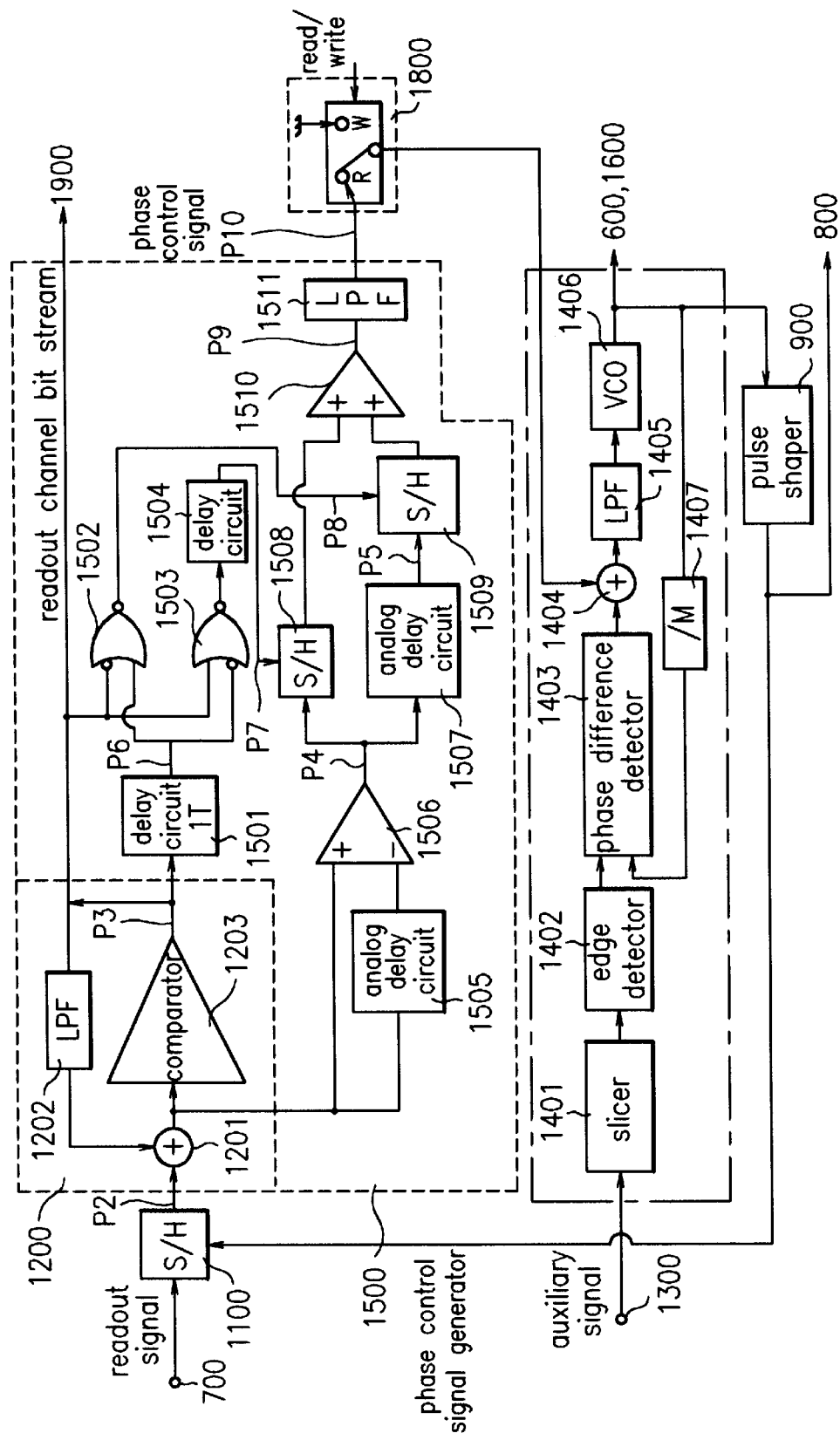
FIG. 8 is a diagram showing the partially detailed circuit according to a first preferred embodiment of the present invention; and, FIGS. 9(a) to 9(c) are the diagrams showing the timing signals to explain the operation of the apparatus shown in FIG. 8.

FIG. 8 is a detailed circuit diagram partially shown a first embodiment of the reading apparatus according to the present invention. FIGS. 9(*a*) to 9(*c*) are the diagrams showing the it waveforms at various points of the block of FIG. 8. FIG. 9(*a*) is the case for the laser beam spot to be generated in advance of the written mark of the optical disk. FIG. 9(*b*) is the case that the laser beam spot is coincident with the written mark of the optical disk. FIG. 9(*c*) is the case that the laser beam spot generation is generated later than the written mark of the optical disk is generated.

First of all, signal detector 700, when the laser beam is irradiated on the optical disk 100 from laser diode 1700, detects an electrical signal from the optical disk 100. On the other hand, a reference signal detector 1300, from the electrical signal, detects an auxiliary signal and applies the auxiliary signal to the clock signal generator 1300. In FIG. 8, the clock signal generator 1400 is based on said auxiliary signal and generates a clock signal having a constant period. That is, if the auxiliary signal is inputted, the slicer 1401 slices the auxiliary signal and the edge detector 1402 detects the edge of the sliced signal. On the other hand, a phase difference detector 1403 detects the phase difference between the output of the edge detector 1402 and the output of the divider 1407 and the adder 1404 adds the phase control signal obtained from the phase control signal generator 1500 and the output of the phase detector 1403. The third low pass filter 1405 filters the output of a second adder 1404. The voltage control oscillator 1406 generates a clock signal in response to the output signal of the filter. Divider 1407 divides the clock signal at a constant rate(1/M) and applies the divided output signal to one input of the phase difference detector 1403.

On the other hand, a pulse shaper 900 is synchronized with the clock signal and applied the signal to the first sample and holder 1100 as its drive signal.

If this drive signal is applied to the first sample and holder 1100, the first sample and holder 1100 samples and holds a readout signal obtained from the signal detector 700, i.e., an analog electrical signal. The output signal of the first sample and holder 1100 is converted into a readout bit signal by the bit stream detector 1200. On the other hand, a first adder 1201 included in the bit stream detector 1200 adds the output of the first sample and holder 1100 and the other signal. The output signal of the first adder 1201 is sliced according to a level by a comparator 1203 and then converted into a readout bit signal. This readout bit signal is filtered by a low pass filter 1202 and then is applied to said first adder 1201 as said other signal.

On the other hand, the phase control signal generator 1500 delays the readout bit signal obtained from the bit detector 1200 and the electrical signal obtained from the first sample and holder 1100 at the specific times by the period of the clock signal. By properly processing the signals after delayed and the signals before delayed, a phase control signal is generated. This means the use of the fact that when the laser beam spot of a pulse type is not exactly focussed on the written mark, at the point at which the high written mark is overlapped with the low written mark, the output signal of the first sample and holder 1100 is not immediately shifted from a high level to a low level, and therefore a middle level between the high level and the low level is detected and the middle level is proportional to the degree of the disagreement between the laser beam spot and the written mark. This phase control signal shows the relative positions between the laser beam spot and the written mark of the optical disk, and when these positions are different from each other, this control signal makes the beam spot and the written mark coincide each other in their positions. In other words, this phase control signal is a signal to make the laser beam spot exactly overlapped on the written mark. As explained beforehand, if the readout bit signal and the electrical signal sampled and held is inputted, the first delay circuit 1501 of the phase control signal generator 1500 delays the readout bit signal by one period of the clock signal. A logic operation unit generated a first drive signal and a second drive signal from the readout bit signal and the delayed readout bit signal. This logic operation unit consists of a first NOR gate 1503 which inputs the readout bit signal obtained from the comparator 1203 and the inverted signal of the delayed readout bit signal obtained from the first delay circuit 1501 and outputs a first drive signal and a second NOR gate 1502 which inputs the inverted signal of the readout bit signal obtained from the comparator 1203 and the delayed readout bit signal obtained from the delay circuit 1501 and outputs a second drive signal. A second delay circuit 1504 delays again the first drive signal by the period of the clock signal. On the other hand, a first analog delay circuit 1505 delays the electrical signal obtained from the first sample and holder 1100 by one period of the clock signal.

The first difference amplifier 1506 receives the output signal of the first delay circuit 1505 as its inverting input and the output signal of the first sample and holder 1100 as its noninverting input. The output signal of the first difference amplifier 1506 is again delayed by a second analog delay circuit 1507 by the period of the clock signal and then applied to the third sample and holder 1509. The output signal of the first difference amplifier 1506 is applied to the sample and holders 1508. On the other hand, the first drive signal is delayed by the second delay circuit 1504 by one period of the clock signal and then applied to the sample and holders 1508 as its drive signal, and the second drive signal is directly applied to the third sample and holder 1509 as its drive signal. That is, these second and third sample and holders 1508 and 1509 sample and hold the output signal of the first difference amplifier 1506 and the delayed output signal of the first difference amplifier 1506 according to the first and second drive signals, respectively. The second operational amplifier 1510 has only two noninverting inputs and receives said two sample and holders 1508 and 1509 as its two noninverting inputs. The output signal of the second operational amplifier 1510 is filtered by a second low pass filter 1511 and then applied to said clock signal generator 1400 by a switch 1800. The switch 1800 disposed between the phase control signal generator 1500 and the clock signal generator 1400 has a writing signal terminal W and a readout signal terminal R. In a reading mode, the switch 1800 supplies said clock signal generator 1400 with the phase control signal.

FIG. 9(a) is a diagram showing the waveforms at various points of the block diagram of FIG. 8 in which the laser beam spot is advanced of the written mark. According to FIG. 9(a), it is noticed that the reading beam pulse, i.e., the laser beam spot $P_0$ of a pulse type is irradiated in advance of the written mark. At this time, the readout signal, that is, an analog electrical signal $P_1$ which is corresponding to the high or low written mark detected from the signal detector 700 is partly larger than the low level but smaller than the high level. The signal $P_2$ is the output signal of the first sample and holder 1100 and the signal $P_3$ is the readout bit signal obtained from the comparator 1203. The signal $P_4$ is the output signal of the first difference amplifier 1506 and the signal $P_5$ is obtained by delaying the output signal $P_4$ of the first difference amplifier 1506 by one period of the clock signal. The signal $P_6$ is obtained by delaying the readout bit signal $P_3$ by one period of the clock signal. The signals $P_7$ and $P_8$ are generated from the first and second NOR gates 1503 and 1502 as the driving signals to drive the sample and holders 1508 and 1509, respectively. At this time, in order to simultaneously drive two sample and holders 1508 and 1509, the first drive signal is delayed by the second delay circuit 1504 by one period of the clock signal and then applied to the sample and holder 1508. As the result, as shown in FIG. 9(a), the sample and holders 1508 and 1509 detect the parts of signal $P_2$ corresponding to the phase difference from the signals $P_4$ and $P_5$ when the first and second drive signals $P_7$ and $P_8$ are applied to two sample and holders 1508 and 1509, respectively, and apply their output signals to the second operational to amplifier 1510 as its input signal. The signal $P_9$ which is an output signal of the second operational amplifier 1510 is filtered by the second low pass filter 1511 and then converted into a signal $P_{10}$. The signal $P_{10}$ has a negative value. Thus, because the clock signal is generated in advance of the normal state, the phase control signal has a negative value which is corresponding to the advanced time so as to delay the generation of the clock signal.

Figure 9B:
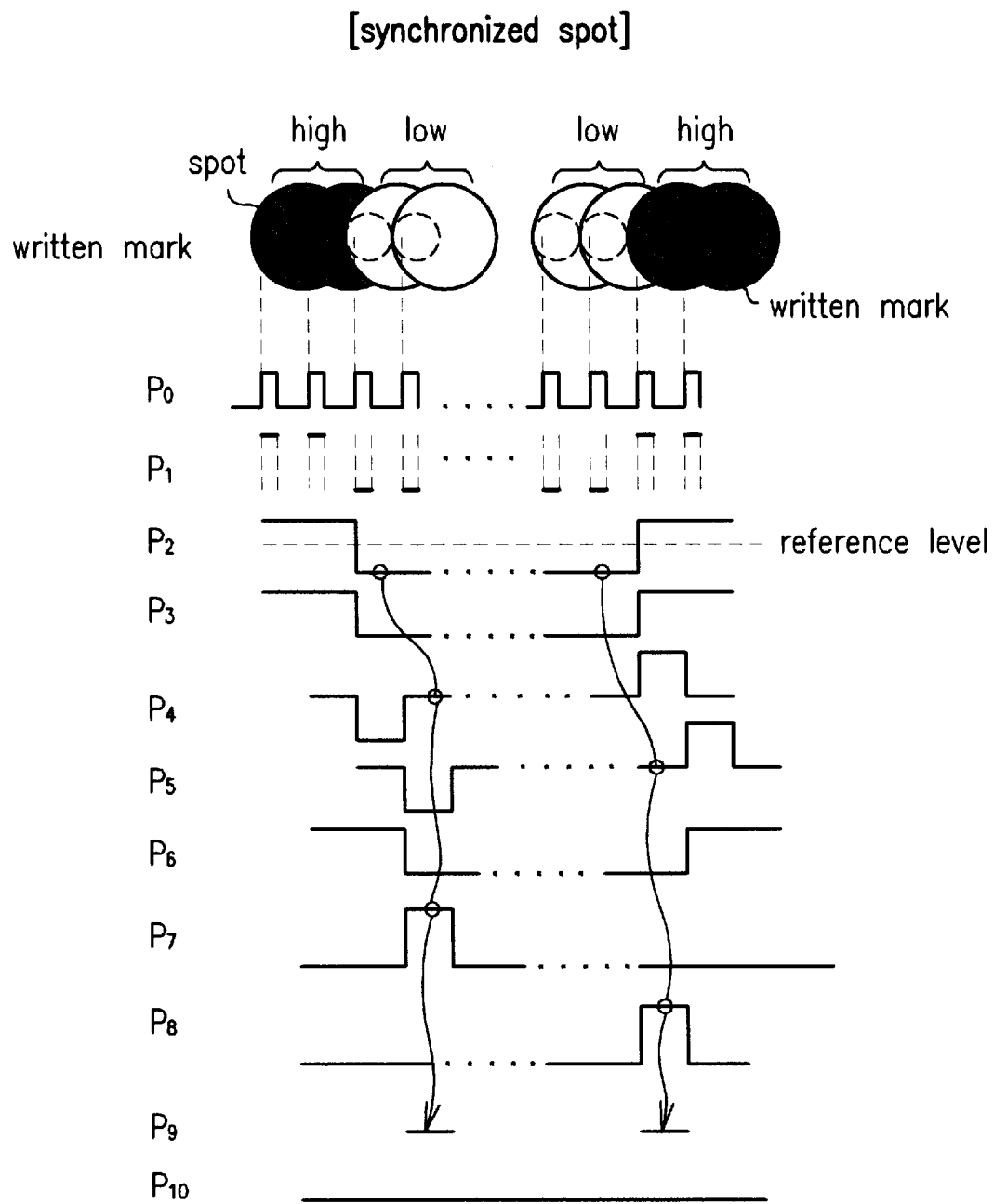

FIG. 9(b) shows the case that the written mark is synchronized with the laser beam spot. There is no part in signal $P_2$ corresponding to the phase difference. Therefore, when the first drive signal $P_7$ and the second drive signal $P_8$ is generated, the signal detected from the signals $P_4$ and $P_5$ by two sample and holders 1508 and 1509 is zero, as shown in the waveform of the signal $P_9$. At this time, the value of the phase control signal $P_{10}$ is zero.

FIG. 9 shows the case that the laser beam spot is irradiated later than the written mark. The electrical signal $P_1$ detected by the signal detector 700 is partly lower than the high level but higher than the low level. The part corresponding to the phase difference in the output signal of the first sample and holder 1100, when the first drive signal $P_7$ and the second drive signal $P_8$ are generated, are detected from the signals $P_4$ and $P_5$ by two second and third sample and holders 1508 and 1509, respectively. Here, the laser beam spot synchronized with the clock signal rather than the written mark is delayed, and therefore a positive signal is detected so as to advance the clock signal.

Figure 9C:
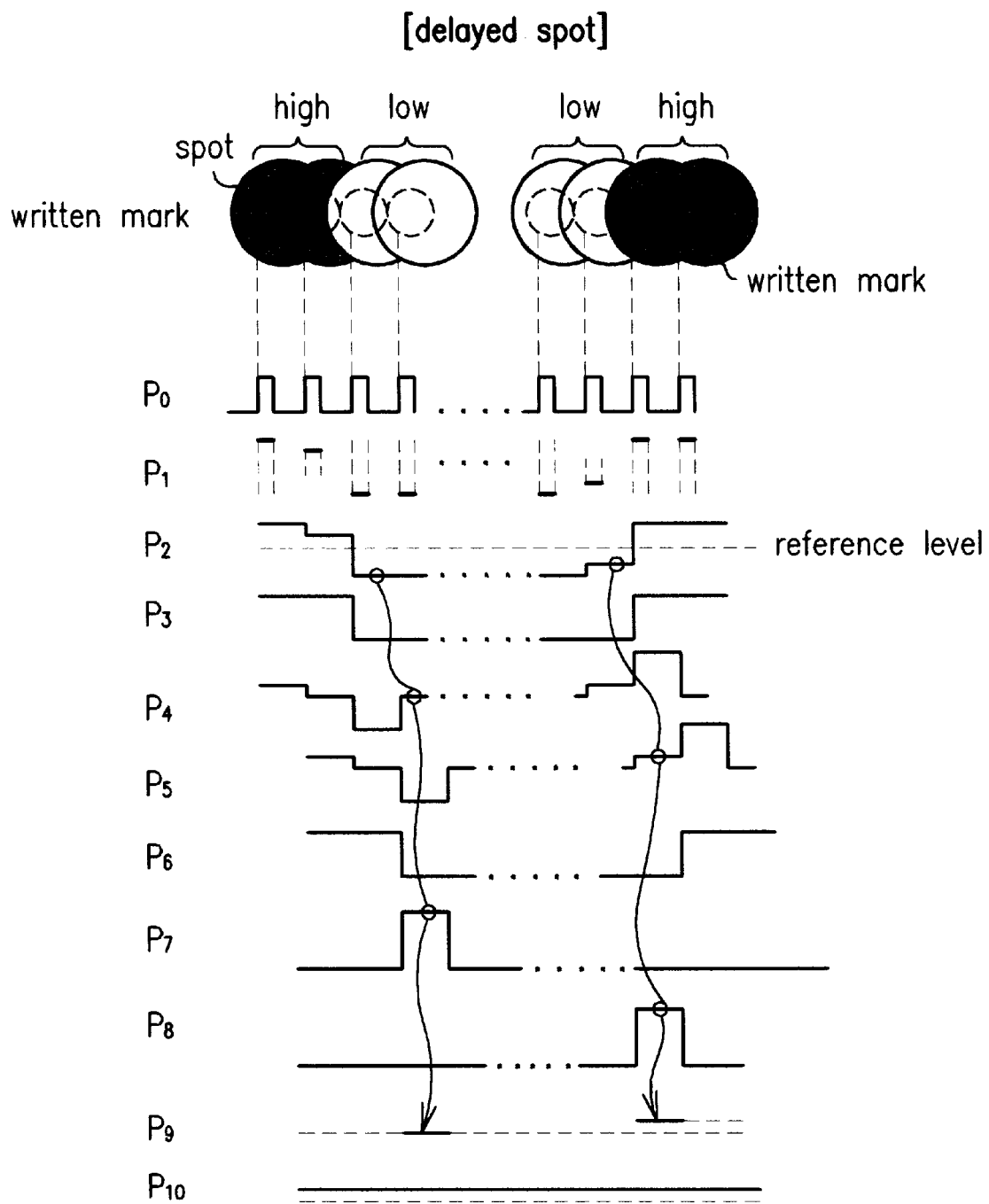

When the signal $P_9$ passes the second operational amplifier 1510 and the second low pass filter 1511 in the order, a phase control signal with a positive value like the signal $P_{10}$ is obtained. Referring to FIGS. 9(a) to 9(c), by comparing the low value obtained just after the output signal of the first sample and holder 1100 is shifted from the high level to the low level with the low value of the following, a phase control signal is obtained.

Figure 10:
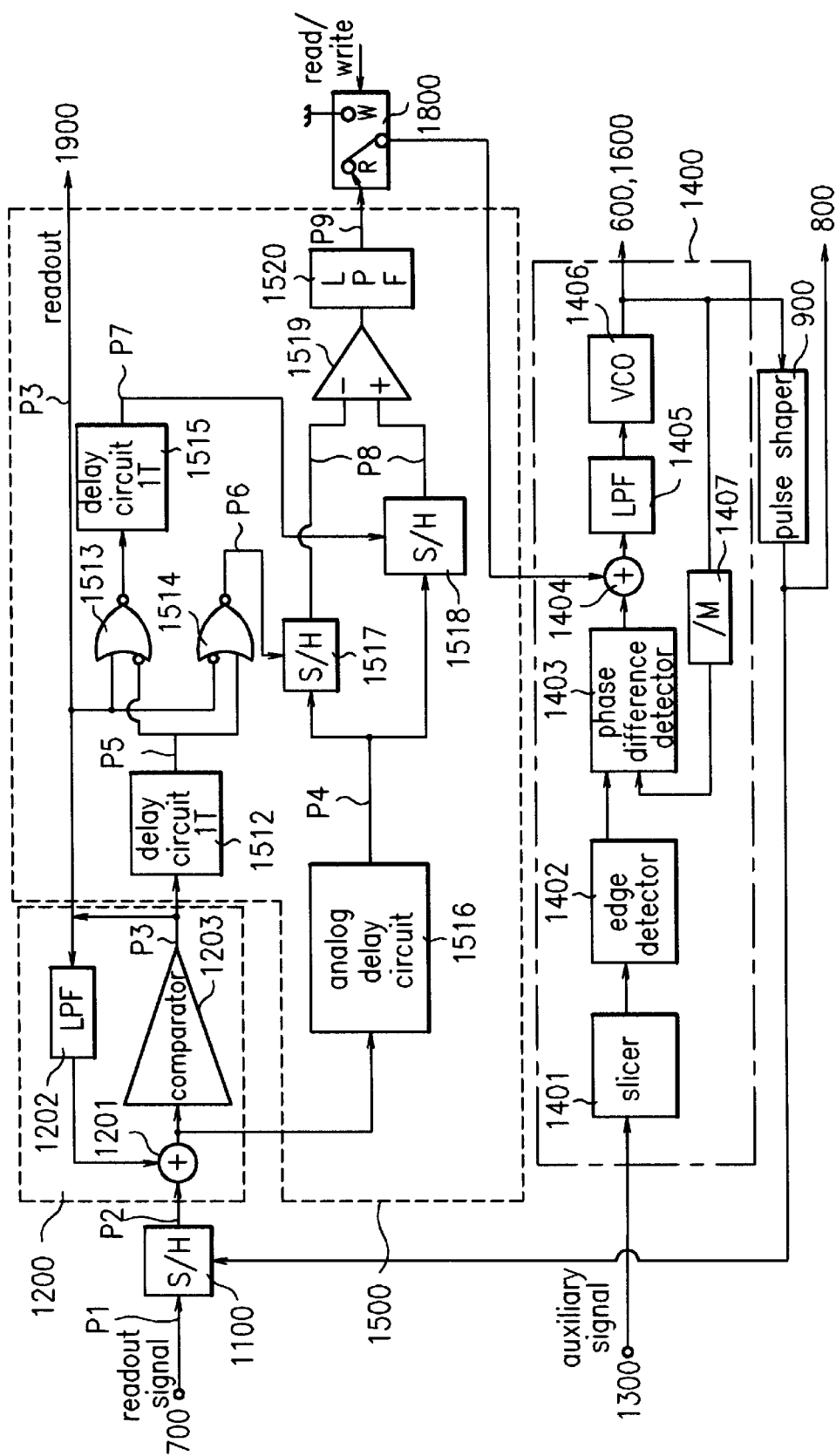
FIG. 10 is a partly detailed circuit of the apparatus according to a second embodiment of the present invention.
Figure 11A:
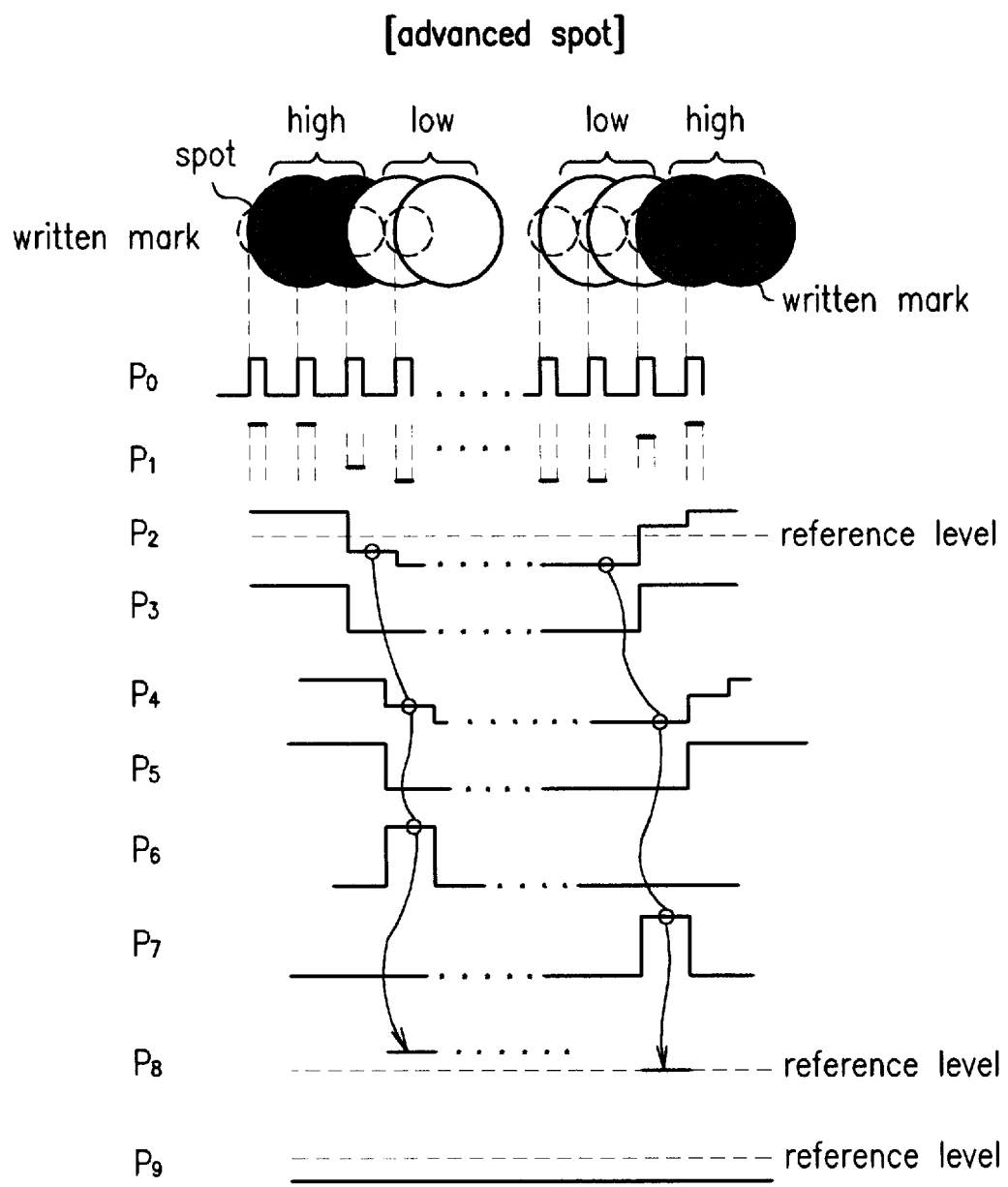
FIGS. 11A to 11C are diagrams showing the timing signals for explaining the operation of the apparatus shown in FIG. 10.
Figure 11B:
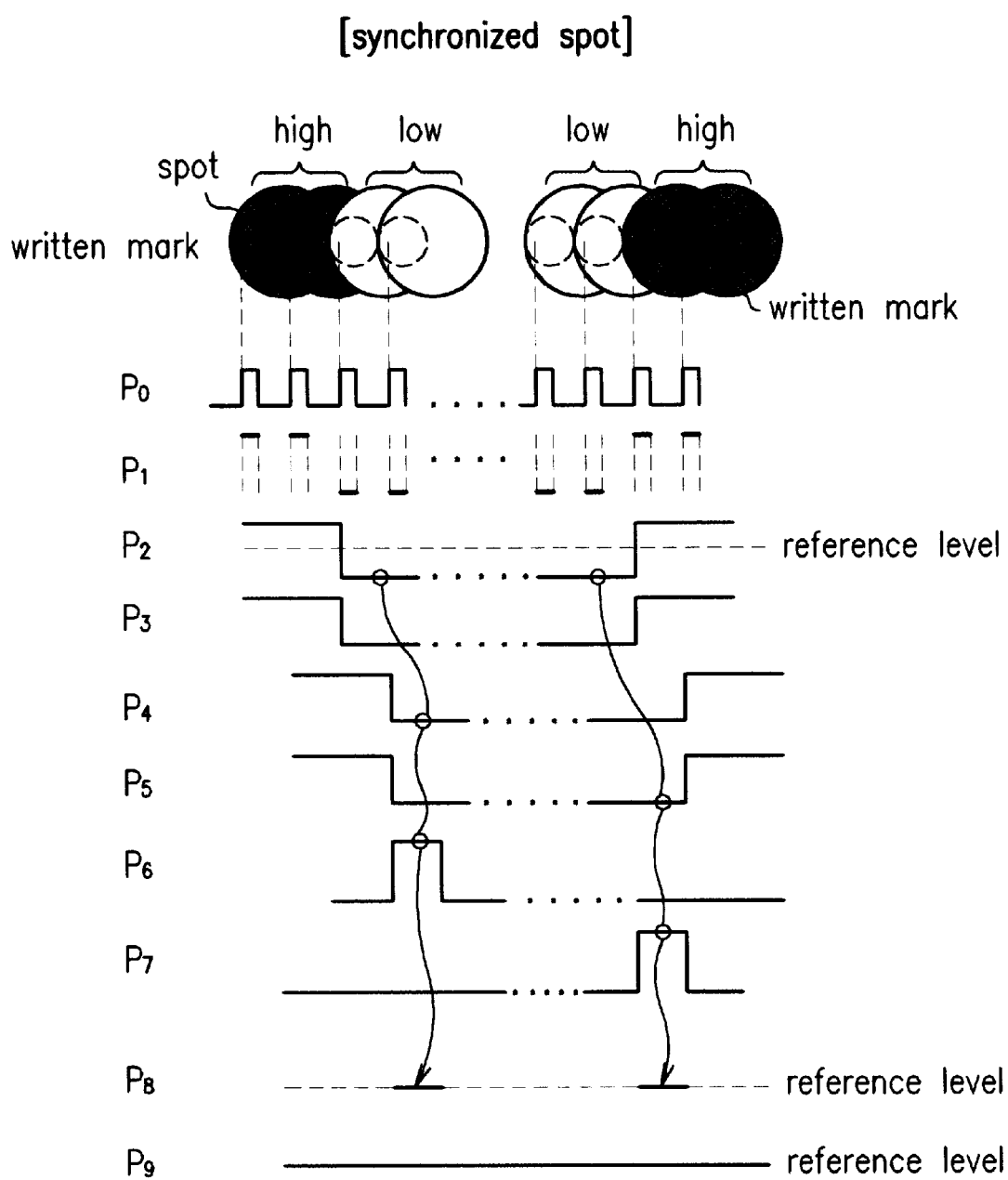
Figure 11C:
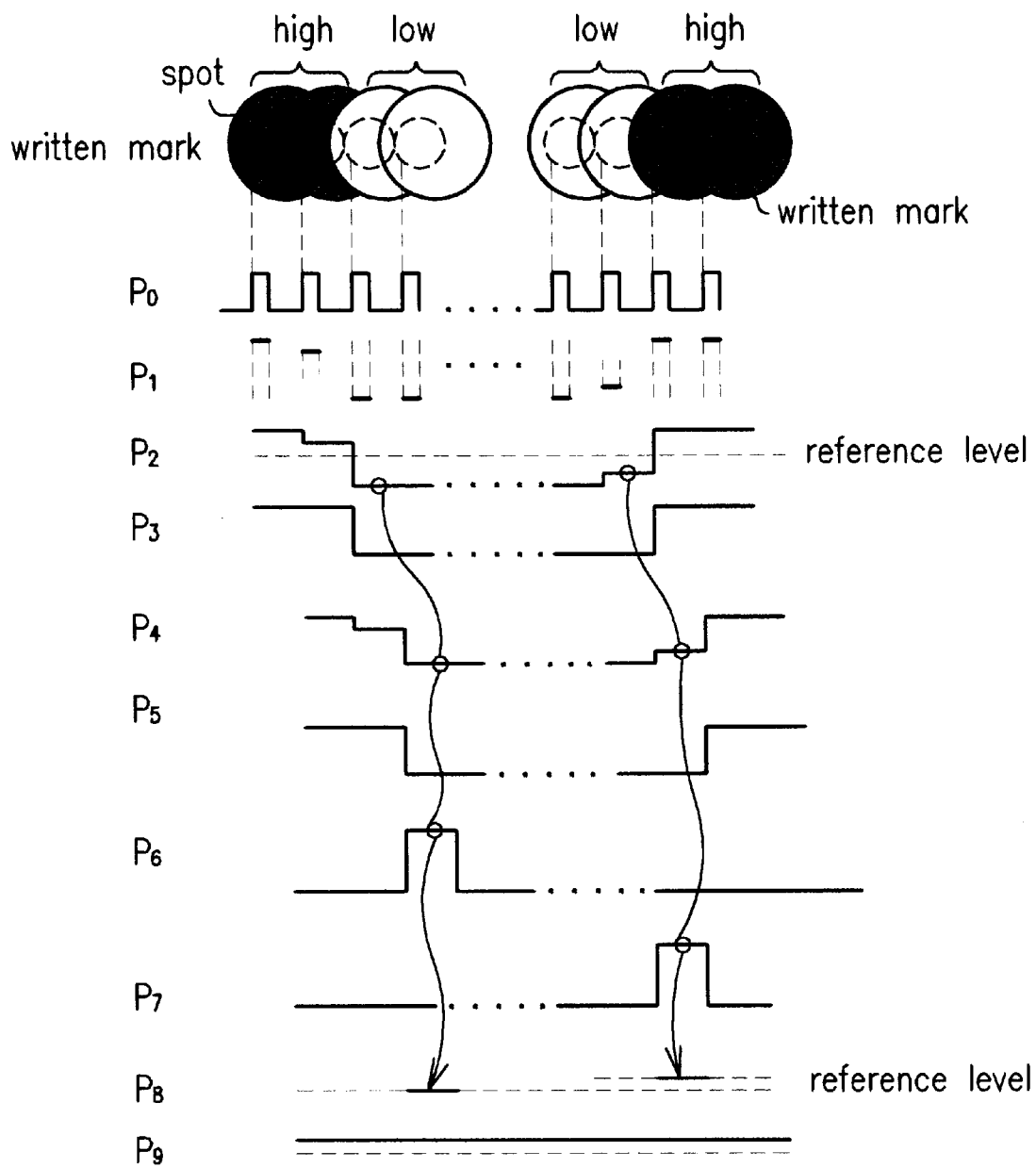

FIG. 10 shows a partly detailed circuit of the apparatus according to the second embodiment of the present invention. FIGS. 11(a) to 11(c) show the waveforms at various points of the circuit in FIG. 10. FIG. 11(a) shows the case that the laser beam spot is generated in advance of the written mark, FIG. 11(b) shows the case that the written mark and the generation of the laser beam spot are synchronized with each other and FIG. 9 shows the case that the laser beam is generated later than the written mark. The structure in FIG. 10 is the same as that in FIG. 8 except the phase control signal generator 1500. Therefore, hereinafter, the phase control signal generator 1500 according to the second embodiment of the present invention will be explained.

In the phase control signal generator 1500, the readout bit signal $P_3$ obtained from the bit stream detector 1200 is delayed by the delay circuit 1512 by one period of the clock signal. The logic operation unit, by using the delayed readout bit signal $P_5$ and the readout bit signal $P_3$, generates the first drive signal $P_6$ and the second drive signal $P_7$. Here, this logic operation unit consists of a fourth NOR gate 1514 which receives the inverted said readout bit signal $P_3$ and the delayed said reading bit signal $P_5$ and outputs a first drive signal $P_6$, and a third NOR gate 1513 which receives the said reading bit signal $P_3$ and the delayed and inverted said reading bit signal $P_5$ and outputs a second drive signal $P_7$. The third delay circuit 1515 delays the second drive signal $P_7$ by one period of the clock signal. On the other hand, the analog delay circuit 1516 delays the output signal $P_2$ of the first sample and holder 1100 by one period of the clock signal. The output signal $P_4$ of the delay circuit 1516 is sampled and held according to two paths. That is, signal $P_4$ is applied to two fourth and fifth sample and holders 1517 and 1518. However, the fourth sample and holder 1517 is driven by the first drive signal $P_6$ and the sample and holder 1518 is driven by the second drive signal delayed by the third delay circuit 1515. The values detected by two fourth and fifth sample and holders 1517 and 1518 forms the waveform of signal $P_8$ which is amplified by the third difference amplifier 1519 and filtered by the second low pass filter 1520. The output signal $P_9$ of the second low pass filter 1520 is applied to the clock signal generator 1400 as a phase control signal through a switch 1800. At this time, the signal sampled and held according to the first drive signal is applied to the noninverting input terminal of the third difference amplifier 1519 and the signal sampled and held according to the second drive signal is applied to the inverting input terminal of the third difference amplifier 1519.

As previously explained, in FIGS. 11(a) to 11(c), the signal $P_0$ is the laser beam of a pulse type, the signal $P_1$ is the detected reading signal, that is, the electrical signal, the signal $P_2$ is the output signal of the first sample and holder 1100, the signal $P_3$ is the reading bit signal converted from the bit stream detector 1200, the signal $P_4$ is the output signal of the first sample and holder 1100 delayed by one period of the clock signal, the signal $P_5$ is the reading bit signal delayed by one period of the clock signal, the signal $P_6$ is the first drive signal, the signal $P_7$ is the second drive signal the signal $P_8$ is the phase difference signals detected by the fourth and fifth sample and holders 1517 and 1518, and the signal $P_9$ is the phase control signal obtained from the second low pass filter 1520.

According to FIG. 11(a), the phase difference signal $P_8$ obtained from output signal $P_2$ of the first sample and holder 1100, when the first drive signal and the second drive signal are generated, is detected from the analog electrical signal $P_4$ by one period of the clock signal by the fourth and fifth sample and holders 1517 and 1518. This phase difference signal $P_8$ becomes the phase control signal with a negative value through the third difference amplifier 1519 and the second low pass filter 1520. Therefore, the generation of the clock signal is delayed, and therefrom it is possible for the laser beam spot to be located on the written mark. According to the FIGS. 11(a) to 11(c), by comparing the first low level signal after the high level electrical signal detected from the optical disk 100 is shifted to a low level signal with the following low level signal and by obtaining the difference signal, the phase control signal of the clock signal is obtained from the electrical signal corresponding to the difference signal. If the phase of the clock signal is controlled by this phase control signal, the written mark coincides with the laser beam and therefrom information is correctly obtained from the written mark. While, in the first embodiment of the present invention, the detected electrical signal is delayed twice by one period of the clock signal and then the phase control signal is obtained from the signal delayed twice, the phase control signal in the second embodiment of the present invention is obtained from the electrical signal delayed once. However, according to the present invention, basically as previously explained, while the electrical signal is detected, for example, as the level of the electrical signal is shifted from high level to low level, the electrical signal with this low level value is compared with the electrical signal with a low level value detected from the magneto-optical writing media. As the result, the difference signal is generated ant the phase control signal of said clock signal is obtained according to the difference signal.

Figure 12:
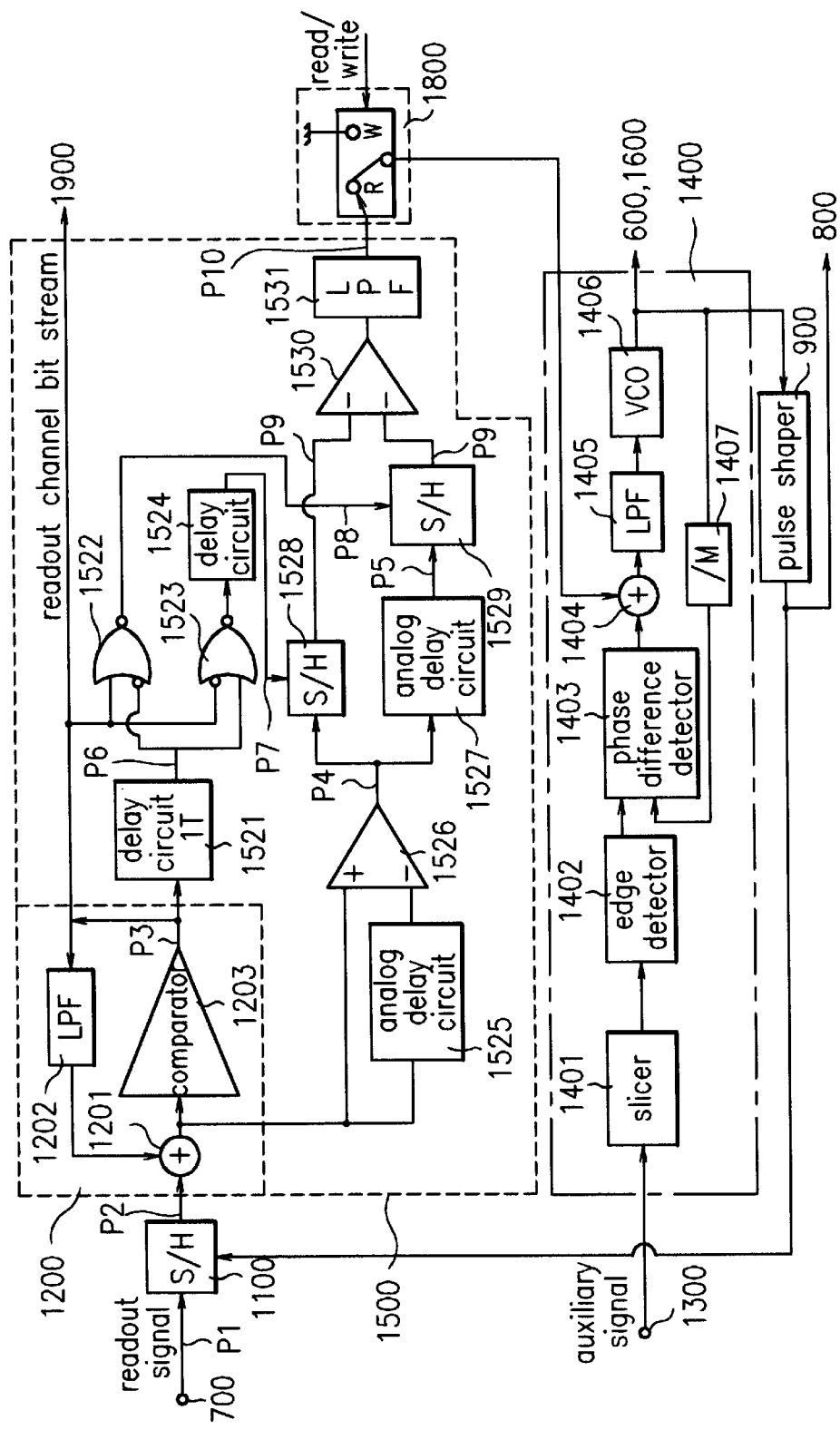
FIG. 12 is a partially detailed circuit of the apparatus according to the third embodiment of the present invention.
Figure 13A:
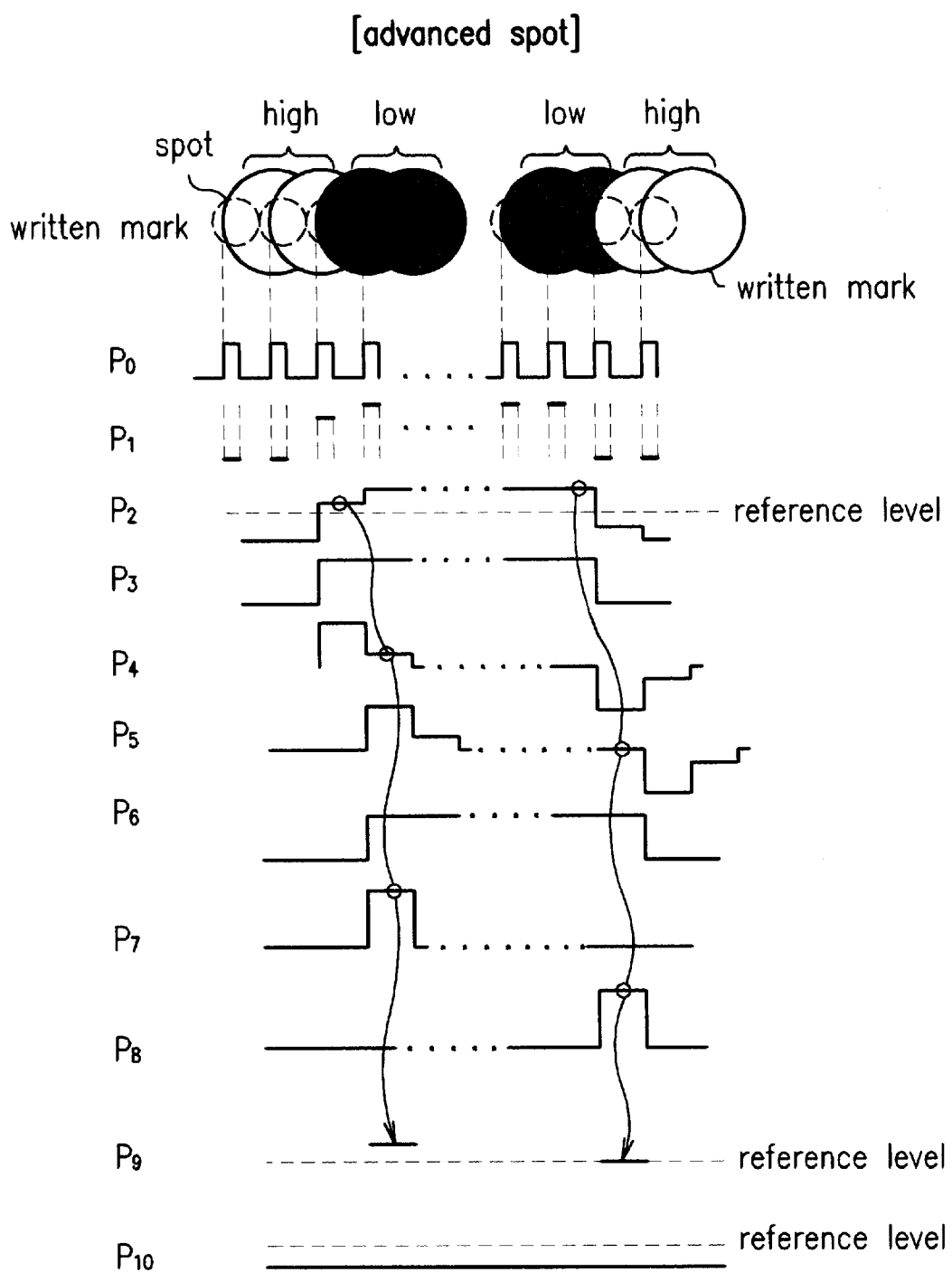
FIGS. 13A to 13C are diagrams showing timing signals for explaining the operation of the apparatus shown in FIG. 12.
Figure 13B:
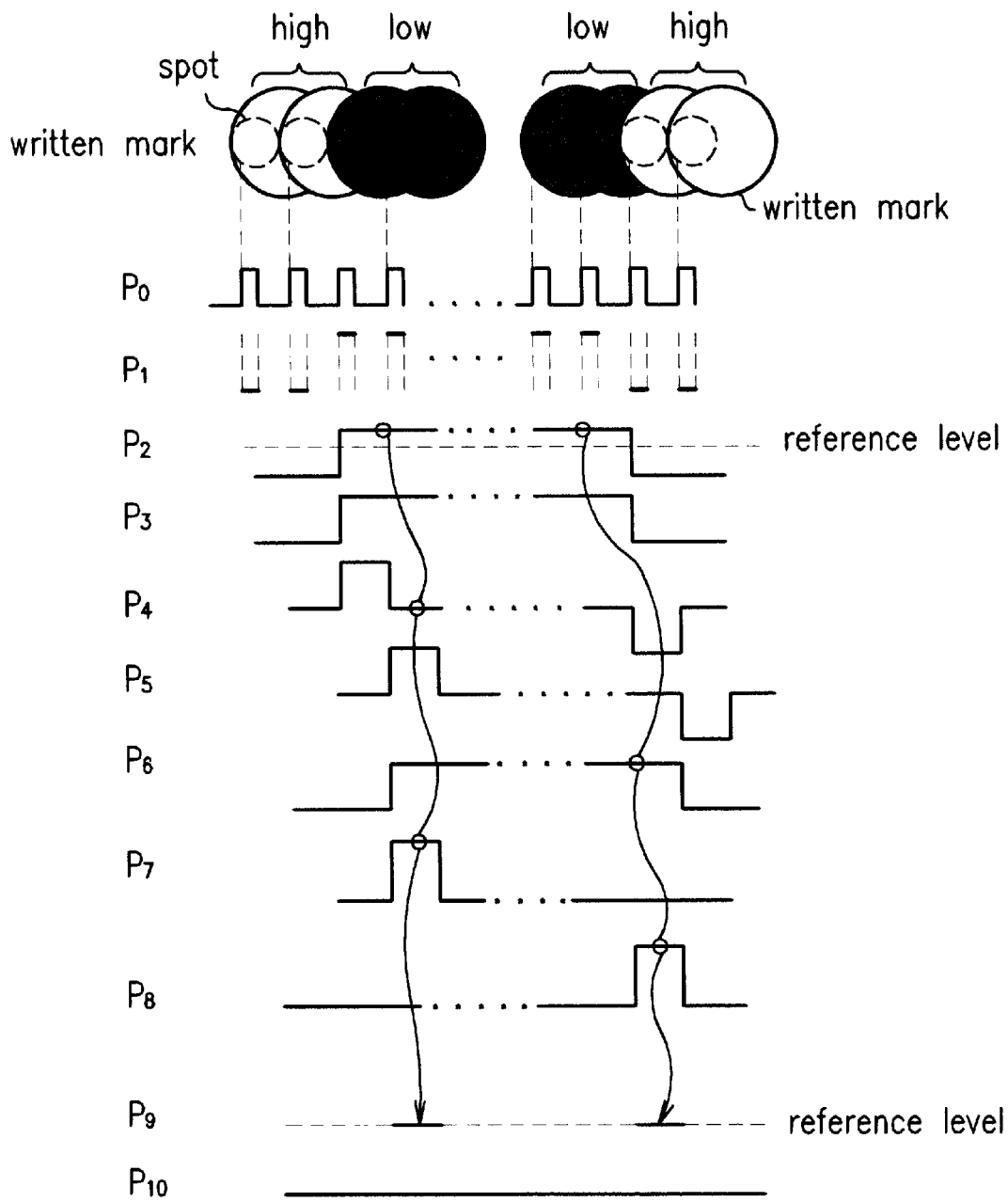
Figure 13C:
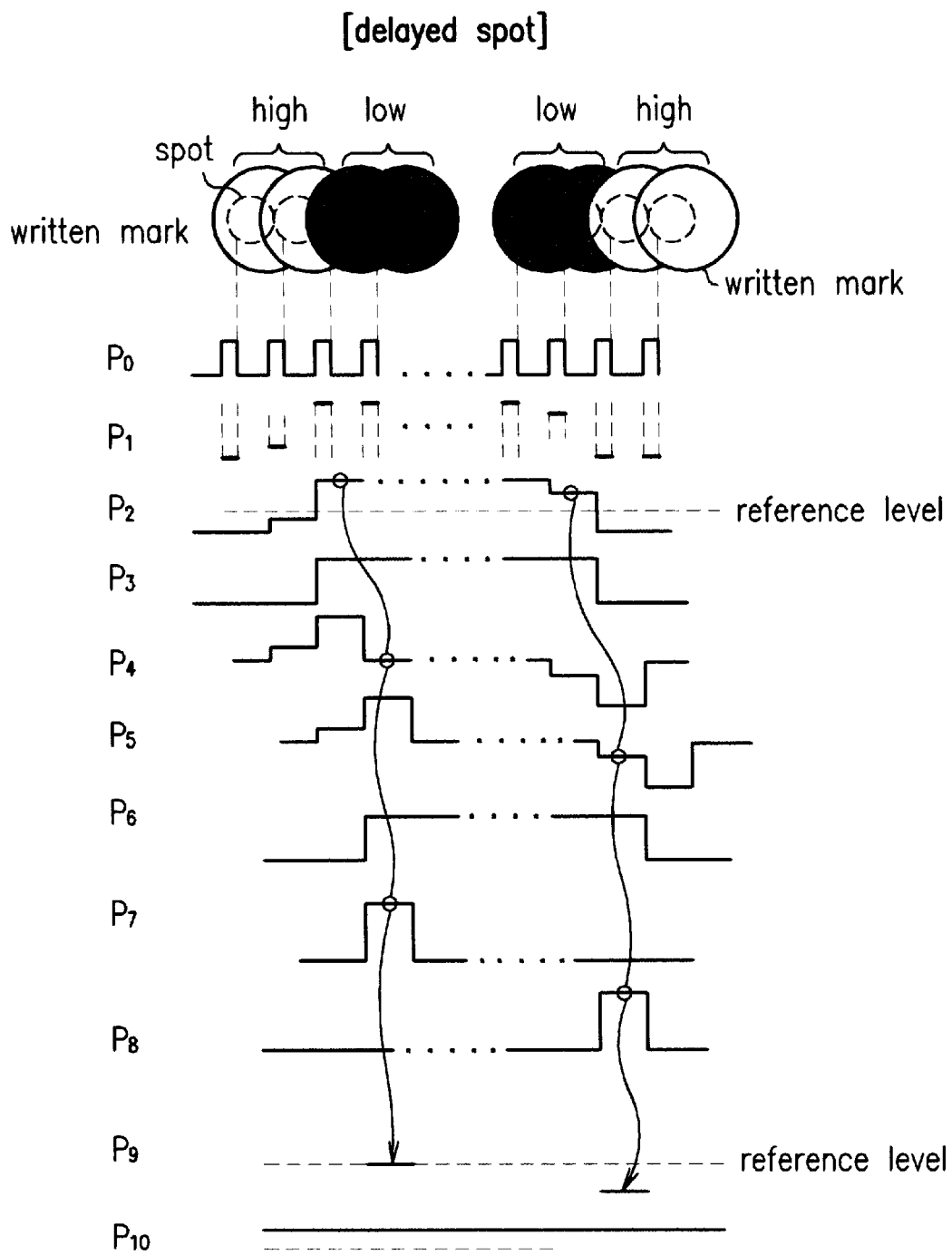

FIG. 12 is a partially detailed circuit of the apparatus according to the third embodiment of the present invention. FIGS. 13(a) to 13(c) show the waveforms at various points of the circuit in FIG. 12. The diagram in FIG. 12 is the same as that in FIG. 8 except the first NOR gate, the second NOR gate and the fourth operational amplifier 1530. While the second operational amplifier 1510 of FIG. 8 has two non-inverting input terminals, the fourth operational amplifier 1530 of FIG. 12, on the contrary, has two inverting input terminals. The circuit of FIG. 12 is used to obtain the phase control signal of the clock signal when the signal level detected from the optical disk 100 is shifted from the low level to the high level. The structures and the operations of both the clock signal generator 1400 and the bit stream detector 1200 in FIG. 12 are the same as those in FIG. 8 and the explanation is omitted. According to FIG. 12 and FIGS. 13(a) to 13(c), the delay circuit 1521 of the phase control signal generator 1500 delays the reading bit signal $P_3$ of the bit stream detector 1200 by one period of the clock signal. The logic operation unit, by using said reading bit signal and the delayed said reading bit signal $P_6$ which is an output signal of the delay circuit 1521, generates the first drive signal $P_7$ and the second drive signal $P_8$. This logic operation unit consists of the first NOR gate 1523 which receives the inverted signal of the reading bit signal $P_3$ and the signal $P_6$ delayed from the reading bit signal $P_3$ and outputs the first drive signal, and the third NOR gate 1522 which receives said reading signal $P_3$ and the inverted signal of said signal $P_6$ and outputs the second drive signal $P_8$. On the other hand, the logic delay circuit 1524 generates the first drive signal $P_7$ by delaying the output signal of the fourth NOR gate 1523 by one period of the clock signal.

The analog delay circuit 1525 delays the output signal $P_2$ of the first sample and holder 1100 by one period of the clock signal, the first difference amplifier 1526 receives the output signal $P_2$ of the first sample and holder 1100 as its noninverting input and the signal delayed by the analog delay circuit 1525 as its inverting input, and amplifies the signals.

The output signal $P_4$ of the first difference amplifier 1526 is again delayed by the delay circuit 1527 by one period of the clock and this delayed signal $P_5$ is applied to the sample and holder 1529. On the other hand, the output signal $P_4$ of the first difference amplifier 1526 is applied to the sample and holder 1528. The sample and holders 1528 and 1529 driven by the first drive signal $P_7$ and the second drive signal $P_8$ sample and hold the signals $P_4$ and $P_5$ and generate the phase difference signals like the signal $P_9$. Here, the phase difference means the difference between the phase of the normal clock signal and the phase of the clock signal whose phase is changed by external disturbances. These phase difference signals $P_9$ are applied to two inverting input terminals of the fourth operational amplifier 1530. The output signal of the fourth operational amplifier 1530 is filtered by the second low pass filter 1531 and then applied to the clock signal generator 1400 as a phase control signal.

FIG. 13(a) shows the case that the clock signal is generated in advance of the written mark. As shown in the signal $P_2$ of FIG. 13(a), after the detected electrical signal is shifted from the low level to the high level, by comparing the high level with the following high level, the phase difference between these two signals is detected.

As previously explained, the signal $P_0$ is the laser beam pulse generated in synchronization with the clock signal, the signal $P_1$ is the analog electrical signal detected from the written mark of the optical disk at every clock signal, the signal $P_2$ is the signal obtained by sampling and holding the analog electrical signals, the signal $P_3$ is the reading bit signal obtained from said analog electrical signal, the signal $P_4$ is the difference signal between said analog electrical signal and the analog electrical signal delayed by one period of the clock signal, the signal $P_5$ is the signal obtained by delaying the difference signal by one period of the clock signal, the signal $P_6$ is the signal obtained by delaying said reading bit signal $P_3$ by one period of the clock signal, the signal $P_7$ is the first drive signal to drive the sample and holder 1528, the signal $P_8$ is the second drive signal to drive the sample and holder 1529, the signal $P_9$ is the phase difference signals between the signals $P_4$ and $P_5$, and the signal $P_{10}$ is the phase control signal obtained from the phase difference signals $P_9$. The phase difference in the signal $P_2$ mentioned above is obtained from the signals $P_4$ and $P_5$ when sample and holders 1528 and 1529 are driven by the first drive signal and the second drive signal, respectively. The phase difference signal $P_9$ obtained like this is converted to the phase control signal $P_{10}$ by passing the fourth operational amplifier 1530 and the second low pass filter 1531. On the other hand, the reason that two input terminals of the operational amplifier 1530 of the phase control signal generator 1500 is to make the phase difference signal $P_9$ be a negative value because the detected phase difference signal $P_9$ has a positive value. In the case of FIG. 13(a), because the clock signal is generated in advance of the corresponding written mark, the phase control signal having a negative value corresponding to the detected phase difference is supplied in order to retard the generation of the clock signal.

FIG. 13(b) is a diagram showing the case that the written mark of the optical disk 100 coincides with the laser beam which is a reading beam. After the signal $P_2$ is shifted from the low level to the high level, there is no phase difference between said high level and the high level detected in the following. Therefore, when the first drive signal $P_7$ and the second drive signal $P_8$ are applied, the phase difference signals $P_9$ which are obtained from the signals $P_4$ and $P_5$ by sample and holders 1528 and 1529 are all zero. Furthermore, the phase control signal $P_{10}$ is also zero.

FIG. 13 is a diagram showing the case that the laser beam spot is irradiated later on the written mark of the optical disk 100. In this case, the clock signal must be generated a little faster. Therefore, the phase control signal with a positive value is required. After the signal $P_2$ of FIG. 13 is shifted from the low level to the high level, there is a level difference corresponding to the phase difference between said high level and the high level detected in the following. The phase difference signals $P_9$ corresponding to this level difference are obtained from the signals $P_4$ and $P_5$ when the first drive signal $P_7$ and the second drive signal $P_8$ are applied to the sample and holders 1528 and 1529, respectively. These phase difference signals $P_9$ passes the fourth operational amplifier 1530 and the second low pass filter 1531 and then is converted into the phase control signal $P_{10}$ having a positive value. The difference between the phase difference signals in the signal $P_9$ has a negative value. However, because the fourth operational amplifier 1530 of FIG. 12 has only the inverting input terminals, its output signal has a positive value. When this positive phase control signal $P_{10}$ is applied to the clock signal generator 1400, the clock signal is generated in advance of the previous clock signal so as to be coincided with the written mark. Therefore, it is possible to read more correctly the written information from the magneto-optical writing media.

It will be apparent to those skilled in the art that various modifications and variations can be made in method and apparatus reading the information from the magneto-optical writing media of the present invention without departing from the spirit or scope of the invention. Thus, it is intended that the present invention covers the modifications and variations of this invention provided they come within the scope of the appended claims and their equivalents.

What is claimed is:

1. A method of reading written information from a magneto-optical writing media by using a reading apparatus generating a clock signal with a constant period, comprising the steps of:

detecting a first electrical signal with a first level value from a written mark of the magneto-optical writing media by irradiating a reading beam spot in synchronization with the clock signal on the written mark;

obtaining a difference signal by comparing, when said first electrical signal with said first level value is shifted to a second electrical signal with a second level value, the second electrical signal with the second level value with the second electrical signal with the second level value detected in next sequence;

obtaining a phase control signal of said clock signal from said difference signal;

controlling a phase of said clock signal according to said phase control signal in order for the reading beam spot to be exactly irradiated on said written mark.

2. A method of reading written information from a magneto-optical writing media as claimed in claim 1, wherein said first level value is a high level value and said second level value is a low level value or said first level value is the low level value and said second level value is the high level value.

3. A method of reading written information from a magneto-optical writing media as claimed in claim 1, wherein said reading beam is a laser beam of a pulse type.

4. A method of reading written information from a magneto-optical writing media as claimed in claim 1, wherein said clock signal is generated within said reading apparatus itself.

5. A method of reading written information from a magneto-optical writing media as claimed in claim 1, wherein said clock signal is generated on its base on an auxiliary signal included in said electrical signal obtained in the step of said detecting.

6. A method of reading written information from a magneto-optical writing media as claimed in claim 1, wherein the A method further comprises the steps of:

generating a pulse signal in synchronization with said clock signal;

generating a pulse type of said reading beam on its base on said pulse signal;

delaying said pulse signal by a period of said clock signal; and first sampling and holding the output signal obtaining from the step of said detecting said electrical signal in synchronization with an output signal of the step of said delaying said pulse signal before the step of obtaining said phase control signal at the step of said obtaining said phase control signal.

7. A method of reading written information from a magneto-optical writing media by using a reading apparatus generating a clock signal with a constant period, comprising the steps of:

detecting an electrical signal from the magneto-optical writing media by irradiating a reading beam spot in synchronization with said clock signal on a written mark of the magneto-optical writing media;

delaying said electrical signal by one period of the clock signal;

difference-amplifying a difference signal between said electrical signal applied to a non-inverting input terminal and a signal which is obtained from the step of said delaying the electrical signal and is applied to an inverting input terminal;

delaying an output signal of the step of said difference-amplifying by one period of the clock signal;

second sampling and holding the output signal of the step of said difference-amplifying;

third sampling and holding an output signal of the step of said delaying said output signal, respectively;

adding two output signals of the steps of said second and third sampling and holding and amplifying the result signal;

filtering the output signal of the step of said amplifying; and outputting the signal of the step of said filtering as a phase control signal of said clock signal.

8. A method of reading written information from a magneto-optical writing media as claimed in claim 7, wherein the phase control signal of said clock signal is grounded in writing mode.

9. A method of reading written information from a magneto-optical writing media as claimed in claim 7, wherein the method further comprises the steps of:

generating a pulse signal synchronized with said clock signal;

generating a pulse type of said reading beam for irradiating on said optical writing media, on its base on said pulse signal;

delaying said pulse signal by the period of said clock signal;

first sampling and holding the output signal of the step of said detecting said electrical signal in synchronization with the output signal of the step of said delaying the pulse signal before the step of delaying said electrical signal;

obtaining a readout bit signal by level-slicing the output signal of the step said first sampling and holding;

filtering said readout bit signal;

adding the output signal of the step of said filtering and the output signal of the step of said first sampling and holding; and providing the output signal of the step of said adding as a signal for level-slicing and for the step of said difference-amplifying.

10. A method of reading written information from a magneto-optical writing media as claimed in claim 9, wherein the step of said filtering is done by a low pass filter.

11. A method of reading written information from a magneto-optical writing media as claimed in claim 9, wherein the method further comprises the steps of:

delaying said readout bit signal by the period of said clock signal;

generating a first drive signal and a second drive signal by doing a logic operation on said readout bit signal and the output signal of the step of said delaying readout bit signal;

delaying the first drive signal by the period of said clock signal; and applying the output signal of the step of said delaying said first drive signal to a second sample and holder for sampling and holding the output signal of the step of said difference-amplifying and applying the signal delayed from said second drive signal to a third sample and holder for sampling and holding a signal delayed from the output signal of the step of said difference-amplifying.

12. A method of reading written information from a magneto-optical writing media as claimed in claim 7, wherein said reading beam is a laser beam.

13. A method of reading written information from a magneto-optical writing media as claimed in claim 7, wherein said reading beam is a pulse type beam.

14. A method of reading written information from a magneto-optical writing media as claimed in claim 7, wherein said clock signal is generated within said reading apparatus itself.

15. A method of reading written information from a magneto-optical writing media as claimed in claim 7, wherein said clock signal is generated, on its base on the auxiliary signal included in the output signal of the step of said detecting said electrical signal.

16. An optical disk reading apparatus of reading written information from a magneto-optical writing media, comprising:

a clock signal generator generating a clock signal having a constant period;

a reading beam generator generating a beam spot to be irradiated on a written mark of the magneto-optical writing media in synchronization with said clock signal;

a signal detector detecting an electrical signal from the written mark when said reading beam is irradiated on the corresponding written mark of the magneto-optical writing media;

a bit stream detector generating a readout signal from said electrical signal; and a phase control signal generator which receives said electrical signal, generates a phase control signal, when said electrical signal is shifted from a first level value to a second level value, according to the difference signal between the second level value and the second level value detected in a next sequence, and applies the phase control signal to said clock signal generator.

17. An optical disk reading apparatus of reading written information from a magneto-optical writing media, comprising:
   a clock signal generator generating a clock signal having a constant period;
   a pulse shaper which generates a pulse signal in synchronization with the clock signal of said clock signal generator;
   a reading beam generator which generates, on its base on said pulse signal, a reading beam spot and irradiates the reading beam spot as a pulse type on a written mark of the magneto-optical writing media;
   a delay circuit delaying said pulse signal by one period of said clock signal;
   a signal detector detecting an electrical signal from the magneto-optical writing media when said reading beam is irradiated on the corresponding written mark of the magneto-optical writing media;
   a sample and holder which samples and holds said electrical signal in synchronization with an output of said delay circuit;
   a bit stream detector generating a readout bit signal from an output signal of said sample and holder; and
   a phase control signal generator which receives the output signal of said sample and holder, generates a phase control signal of the clock signal, when the output signal of said sample and holder is shifted from a first level value to a second level value, according to a difference signal between the second level value and the second level value detected in a next sequence, and applies the phase control signal to said clock signal generator.

18. An optical disk reading apparatus as claimed in claim 17, wherein said first level value is a high level value and said second level value is a low level value or said first level value is the low level value and said second level value is the high level value.

19. An optical disk reading apparatus as claimed in claim 17, wherein said clock signal generator generates a clock signal within said apparatus itself without receiving external signals.

20. An optical disk reading apparatus as claimed in claim 17, wherein the reading apparatus further comprises a reference signal detector which detects an auxiliary signal included in the output signal of said signal detector as a reference signal to generate said clock signal and applies the auxiliary signal to said clock signal generator.

21. An optical disk reading apparatus as claimed in claim 20, wherein said clock signal generator further comprises:
   a slicer slicing said auxiliary signal;
   an edge detector detecting an edge of the output signal of said slicer;
   a phase difference detector detecting the phase difference between the output signal of said edge detector and an input signal;
   a first adder adding said phase control signal and the output signal of the phase difference detector;
   a low pass filter filtering the output signal of the first adder;
   a voltage controlled oscillator providing its oscillating signal as said clock signal according to the output signal of the low pass filter; and
   a divider which divides the output signal of the voltage controlled oscillator and supplies said phase difference detector with the output signal of said divider as the other input signal.

22. An optical disk reading apparatus as claimed in claim 17, wherein said bit stream detector further comprises:
   a first adder adding the output signal of said first sample and an holder and an input signal;
   a comparator generating a readout bit signal by level-slicing the output signal of the first adder; and
   a low pass filter which filters said readout bit signal and applies the output signal of said filter to said first adder as the input signal.

23. An optical disk reading apparatus as claimed in claim 17, wherein a switch is further included between said phase control signal generator and said clock signal generator so as to ground said phase control signal in the writing mode and to be connected to said clock signal generator.

* * * * *